United States Patent
Horie et al.

(10) Patent No.: US 11,760,063 B2
(45) Date of Patent: Sep. 19, 2023

(54) ROUGHENED NICKEL-PLATED SHEET

(71) Applicant: TOYO KOHAN CO., LTD., Tokyo (JP)

(72) Inventors: Shinichirou Horie, Kudamatsu (JP); Etsuro Tsutsumi, Kudamatsu (JP); Toshifumi Koyanagi, Kudamatsu (JP); Koh Yoshioka, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 193 days.

(21) Appl. No.: 17/260,456

(22) PCT Filed: Jul. 19, 2019

(86) PCT No.: PCT/JP2019/028562
§ 371 (c)(1),
(2) Date: Jan. 14, 2021

(87) PCT Pub. No.: WO2020/017655
PCT Pub. Date: Jan. 23, 2020

(65) Prior Publication Data
US 2021/0268770 A1    Sep. 2, 2021

(30) Foreign Application Priority Data

| Jul. 19, 2018 | (JP) | 2018-135582 |
| Jan. 31, 2019 | (JP) | 2019-015942 |
| Jun. 11, 2019 | (JP) | 2019-108779 |

(51) Int. Cl.
*B32B 15/01* (2006.01)
*C25D 5/00* (2006.01)
(Continued)

(52) U.S. Cl.
CPC ........... *B32B 15/015* (2013.01); *C25D 3/12* (2013.01); *C25D 5/12* (2013.01); *C25D 5/16* (2013.01);
(Continued)

(58) Field of Classification Search
USPC ............................................. 428/680
See application file for complete search history.

(56) References Cited

U.S. PATENT DOCUMENTS

| 4,058,439 A | * | 11/1977 | Tamura | C25D 15/02 205/279 |
| 9,707,738 B1 | * | 7/2017 | Cheng | B32B 37/10 |

(Continued)

FOREIGN PATENT DOCUMENTS

| JP | 2011-021216 A | 2/2011 |
| JP | 2013-095991 A | 5/2013 |
| JP | 5885345 B2 | 3/2016 |

OTHER PUBLICATIONS

International Search Report for PCT/JP2019/028562 dated, Aug. 20, 2019 (PCT/ISA/210).
(Continued)

*Primary Examiner* — Seth Dumbris
(74) *Attorney, Agent, or Firm* — Sughrue Mion, PLLC

(57) ABSTRACT

There is provided a roughened nickel-plated sheet having a roughened nickel layer as an outermost surface layer on at least one surface of a metal base material, wherein the brightness $L^*$ of the surface of the roughened nickel layer is 30 to 50, the glossiness of 85° of the surface of the roughened nickel layer is 1.5 to 50.

8 Claims, 16 Drawing Sheets

(51) Int. Cl.
  *C25D 5/12* (2006.01)
  *C25D 3/12* (2006.01)
  *C25D 5/16* (2006.01)
  *C25D 7/00* (2006.01)
(52) U.S. Cl.
  CPC ............ *C25D 5/605* (2020.08); *C25D 5/623* (2020.08); *C25D 5/627* (2020.08); *C25D 7/00* (2013.01); *B32B 2307/406* (2013.01); *B32B 2307/538* (2013.01); *B32B 2307/72* (2013.01); *Y10T 428/12944* (2015.01)

(56) References Cited

U.S. PATENT DOCUMENTS

| | | | |
|---|---|---|---|
| 2004/0191560 A1* | 9/2004 | Matsuda | C25D 5/605 428/626 |
| 2012/0111613 A1 | 5/2012 | Oguro et al. | |
| 2015/0111057 A1 | 4/2015 | Taya et al. | |
| 2015/0212244 A1* | 7/2015 | Kim | C23C 14/34 204/192.28 |
| 2016/0102414 A1* | 4/2016 | Tani | C25D 5/14 205/152 |

OTHER PUBLICATIONS

Office Action dated Feb. 8, 2023 in corresponding Chinese Application No. 201980047842.3.
Office Action dated Jan. 31, 2023 in corresponding Japanese Application No. 2020-531398.

* cited by examiner

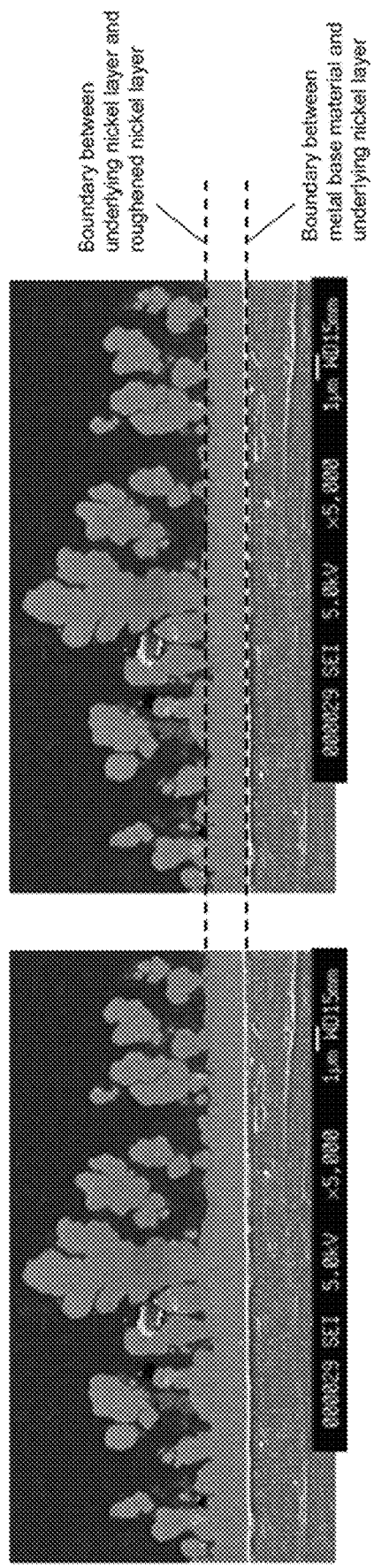

ROUGHENED NICKEL-PLATED SHEET

CROSS REFERENCE TO RELATED APPLICATIONS

This application is a National Stage of International Application No. PCT/JP2019/028562 filed Jul. 19, 2019, claiming priority based on Japanese Patent Application No. 2018-135582 filed Jul. 19, 2018, Japanese Patent Application No. 2019-015942 filed Jan. 31, 2019, and Japanese Patent Application No. 2019-108779 filed Jun. 11, 2019.

TECHNICAL FIELD

The present invention relates to a roughened nickel-plated sheet having a roughened nickel layer as an outermost surface layer.

BACKGROUND ART

Conventionally, as a member constituting the battery, or a member constituting the electronic-related equipment, nickel plated steel sheet is used. In such a nickel-plated steel sheet, when bonded with other members, in a view of improving adhesion, a method of controlling the surface structure of the nickel-plated steel sheet is known.

For example, Patent Document 1 discloses a surface-treated steel sheet famed by forming a nickel plating layer having a microstructure controlled to a particle density of 2 to 500 particles/$\mu m^2$ and an average particle diameter of 0.05 to 0.7 µm on a steel sheet.

PATENT DOCUMENT

Patent Document 1: Japanese Patent No. 5885345

SUMMARY OF THE INVENTION

Problem to be Solved by the Invention

However, in the surface-treated steel sheet disclosed in Patent Document 1, depending on the type of the member to be bonded to the surface-treated steel sheet and the bonding method, the adhesiveness with other members may be insufficient, and further improvement of the adhesiveness has been demanded.

On the other hand, a method of forming a nickel plating layer by roughening plating is also conceivable in order to improve the adhesion with other members, but when the present inventors have investigated, it has been found that there is a problem that the adhesion of the roughened plating layer itself formed by roughening plating to the base material is lowered, and thus the reliability is lowered in some cases.

It is an object of the present invention to provide a roughened nickel-plated sheet exhibiting excellent adhesion to other members while maintaining good adhesion of a plating layer to a base material.

Means for Solving the Problem

As a result of intensive studies to achieve the above object, the present inventors have found that by controlling the lightness and the glossiness of 85° of the surface of the roughened nickel layer to a specific range, it is possible to obtain a roughened nickel-plated sheet exhibiting excellent adhesion to other members while maintaining good adhesiveness of the plating layer to the base material, thereby completing the present invention.

Specifically, according to the present invention, there is provided a roughened nickel-plated sheet having a roughened nickel layer as an outermost surface layer on at least one surface of a metal base material, wherein the brightness L* of the surface of the roughened nickel layer is 30 to 50, the glossiness of 85° the surface of the roughened nickel layer is 1.5 to 50.

In the roughened nickel-plated sheet according to the present invention, it is preferable that the metal base material is a metal sheet or a metal foil made of one kind of pure metal selected from Fe, Cu, Al, and Ni, or a metal sheet or a metal foil made of an alloy containing one kind selected from Fe, Cu, Al, and Ni.

In the roughened nickel-plated sheet according to the present invention, it is preferable that the metal base material is a steel sheet.

In the roughened nickel-plated sheet according to the present invention, it is preferable that the thickness of the metal base material is 0.01 to 2.0 mm.

In the roughened nickel-plated sheet according to the present invention, it is preferable that the deposition amount of nickel plating is 5.0 to 50.0 $g/m^2$.

In the roughened nickel-plated sheet according to the present invention, it is preferable that the roughened nickel layer has an arithmetic mean roughness Ra of 0.1 to 3.0 µm by laser microscopy, and the roughened nickel layer has a ten-point mean roughness $Rz_{jis}$ of 2.0 to 20.0 µm by laser microscopy.

Effects of Invention

According to the present invention, there can be provided a roughened nickel-plated sheet which is excellent in adhesion to other members while maintaining good adhesiveness of the plating layer to the base material.

BRIEF DESCRIPTION OF DRAWINGS

FIG. 15(A) and FIG. 15(B) is a diagram for explaining a method of determining a boundary between a metal substrate and an underlying nickel layer and a boundary between an underlying nickel layer and a roughened nickel layer in Examples and Comparative Examples.

DESCRIPTION OF EMBODIMENTS

Figure 1A:
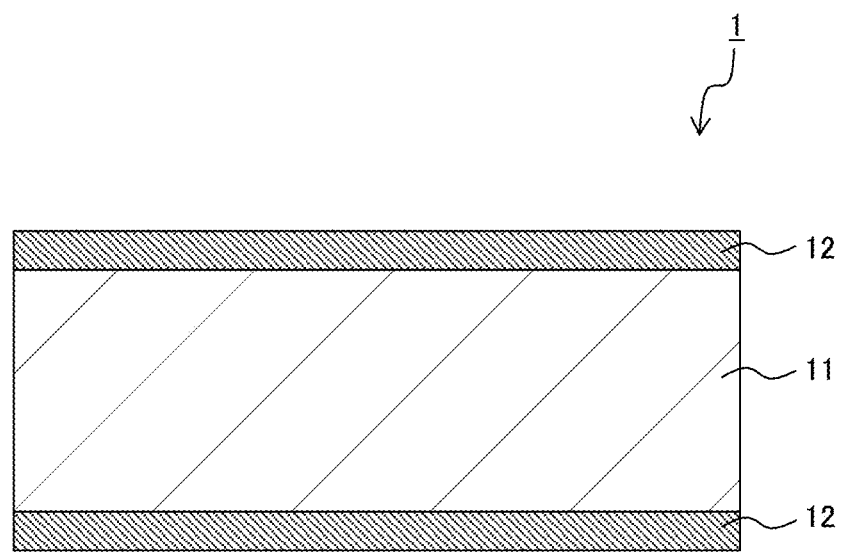
FIG. 1A is a configuration diagram of a roughened nickel-plated sheet according to the present embodiment.

FIG. 1A is a diagram showing a configuration of a roughened nickel-plated sheet 1 of the present embodiment. As shown in FIG. 1A, the roughened nickel-plated sheet 1 of the present embodiment is famed with a roughened nickel layer 12 as an outermost surface layer on a metal base material 11. In the roughened nickel-plated sheet 1 according to the present embodiment, the roughened nickel layer 12 has a brightness L* of 30 to 50 and a glossiness of 85° of 3 to 50.

Figure 1B:
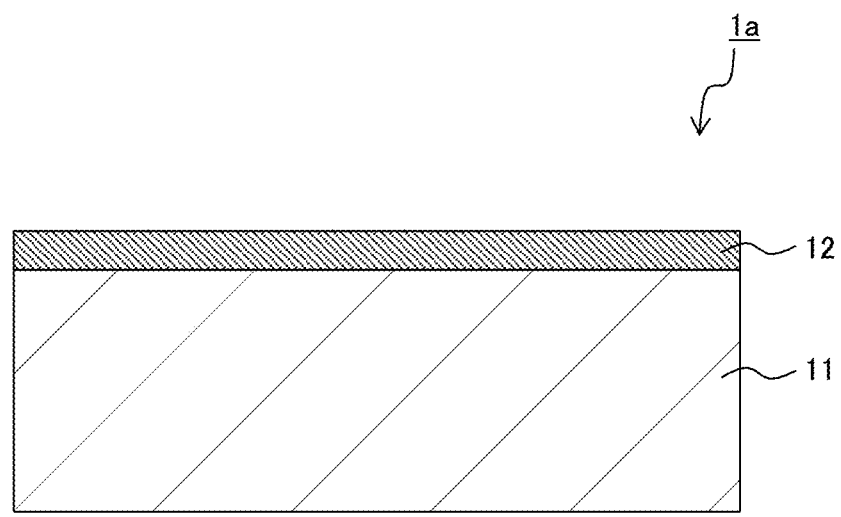
FIG. 1B is a configuration diagram of a roughened nickel-plated sheet according to another embodiment.

In the present embodiment, as shown in FIG. 1A, the roughened nickel-plated sheet 1 in which the roughened nickel layer 12 is famed on both surfaces of the metal base material 11 is exemplified, but it is not particularly limited to such an embodiment, and for example, the roughened nickel layer 12 may be formed on one surface of the metal base material 11 as in the roughened nickel-plated sheet 1a shown in FIG. 1B.

<Metal Base Material 11>

The metal base material 11 as a substrate of the roughened nickel-plated sheet 1 of the present embodiment is not particularly limited, a metal sheet or a metal foil made of a kind of pure metal selected from Fe, Cu, Al and Ni, or a metal sheet or a metal foil made of an alloy containing one kind selected from Fe, Cu, Al, and Ni, specifically, steel sheet, iron sheet, stainless steel sheet, cupper sheet, aluminum sheet, or nickel sheet (these may be any of pure metal and alloys, may be foil.) Among them, since the plating is easily performed even with a relatively simple pretreatment of the plating process and it is easy to form a high adhesion roughened nickel layer to the metal base material, a steel sheet or a copper sheet is preferred, in particular, a low-carbon aluminum-killed steel (carbon content of 0.01 to 0.15% by weight), extra-low carbon steel having a carbon content of 0.01% by weight or less (preferably a carbon content of 0.003% by weight or less), or non-aging extra-low carbon steel made by adding Ti, Nb and the like to an extra-low carbon steel are preferably used.

In the present embodiment, steel sheet, cupper sheet, aluminum sheet, or a nickel sheet which is obtained by hot rolling any of these sheets, acid pickling the hot rolled sheet to remove scales (oxide film) on the surface, cold rolling the pickled sheet can be used as a substrate. Alternatively, a sheet to which annealing or tempering rolling is performed after electrolytic cleaning may be used. In this case, annealing may be any of continuous annealing or box annealing, not particularly limited. In addition, as the electrolytic foil produced by electroforming method, copper foil, nickel foil, iron foil or the like can also be used as a metal base material.

Incidentally, as the metal base material 11, when using a metal base material in which a passive film is formed on the surface such as a stainless steel sheet and a nickel sheet, before roughened nickel plating or before plating process for forming the underlying metal plating, it is preferable to use those subjected to strike nickel plating. The conditions of the strike nickel plating are not particularly limited, and for example, the following conditions can be given. Under the following conditions, the deposition amount of nickel by strike nickel plating is usually 0.08 to 0.89 g/m$^2$, but when forming an underlying nickel layer, the sum of the deposition amount of nickel by strike nickel plating and the deposition amount of nickel by nickel plating to form an underlying nickel layer is measured as the deposition amount of nickel by the underlying nickel layer.

Bath composition: Nickel sulfate hexahydrate 100 to 300 g/L, sulfuric acid 10 to 200 g/L pH: 1.0 or less Bath temperature: 40 to 70° C.

Current density: 5 to 100 A/dm$^2$

Plating time: 3 to 100 seconds

The thickness of the metal base material 11 is not particularly limited, but is preferably 0.01 to 2.0 mm, more preferably 0.025 to 1.6 mm, and still more preferably 0.025 to 0.3 mm. Further, the roughness of the metal base material 11 is not particularly limited, but the arithmetic mean roughness Ra in the stylus surface roughness meter is 0.05 to 2.0 μm, more preferably 0.05 to 0.9 μm, and still more preferably 0.05 to 0.5 μm.

<Roughened Nickel Layer 12>

The roughened nickel layer 12 formed on the outermost surface of the roughened nickel-plated sheet 1 of the present embodiment is one where the brightness L* of the surface is controlled to 30 to 50 and a glossiness of 85° of the surface is controlled to 3 to 50. According to the present embodiment, by controlling the brightness L* and the glossiness of 85° of the surfaces of the roughened nickel layer 12 within the above ranges, the roughened nickel-plated sheet 1 can be made one which exhibits excellent adhesion to other members while maintaining good adhesion of the roughened nickel layer 12 to the metal base material 11.

In particular, as a result of intensive investigation by the present inventors of the relation between the brightness L* and the glossiness of 85° of the surface of the roughened nickel layer 12 and the adhesiveness of the roughened nickel layer 12 to the metal base material 11 and the adhesiveness of the roughened nickel layer 12 to other members, the present inventors have found that by setting the brightness L* and the glossiness of 85° of the surface of the roughened nickel layer 12 to the above ranges, the roughened nickel-plated sheet 1 can exhibit excellent adhesiveness to other members while maintaining the adhesiveness of the roughened nickel layer 12 well, and the present invention has been completed.

Here, according to the present embodiment, in addition to exhibiting excellent adhesion to other members, attention is also paid to the adhesiveness of the roughened nickel layer 12 to the metal base material 11, which is for the following reason. That is, by forming the roughened nickel layer 12, even if it is possible to exhibit excellent adhesion to other members, when the roughened nickel layer 12 is easy to fall off from the metal base material 11, due to that the roughened nickel layer 12 falls off, the effect by forming the roughened nickel layer 12 becomes insufficient, i.e., the effect where it is possible to exhibit excellent adhesion to other members becomes insufficient. Therefore, from such a viewpoint, the present inventors have paid the attention to the adhesion of the roughened nickel layer 12 to the metal base material 11, and have improved this.

In addition, if the adhesion of the roughened nickel layer 12 to the metal base material 11 is insufficient, when producing the roughened nickel-plated sheet 1 of the present embodiment, the plating film scraps (Ni powder) due to the falling off of the roughened nickel layer 12 is mixed in the manufacturing line, in addition to that may cause contamination or failure of the production line, there is a case that causes product defects due to the plating film scraps remaining in the production line. Furthermore, using the roughened nickel-plated sheet 1 of the present embodiment, even when actually processed into products or parts, and there is it causes contamination or failure of the manufacturing line similarly, and there is a possibility that it causes defects in terms of the quality or function of the final product. Therefore, also from such viewpoint, the present inventors have paid attention to the importance of the adhesion of the roughened nickel layer 12 to the metal base material 11, and have improved this.

The brightness of the surface of the roughened nickel layer 12 is from 30 to 50, preferably from 30 to 48, more preferably from 30 to 45, and even more preferably from 35 to 45, by a value of L*. From the viewpoint of emphasizing production efficiency and production cost, it is preferable that the brightness of the surface of the roughened nickel layer 12 is 36 to 48. If the value of the brightness L* is too small, the adhesion of the roughened nickel layer 12 to the metal base material 11 becomes inferior, whereas, if the value of the brightness L* is too large, the adhesion to other members becomes inferior. Note that the brightness L* of the surface of the roughened nickel layer 12 can be measured using a spectrophotometer by the SCE-method (specular reflected light removing method) in accordance with JIS 28722.

The glossiness of 85° of the surface of the roughened nickel layer 12 is 1.5 to 50, preferably 1.5 to 35, and more preferably 2 to 30. From the viewpoint of emphasizing production efficiency and production cost, the glossiness of 85° of the surface of the roughened nickel layer 12 is preferably 15 to 50. If the glossiness of 85° is too small, the adhesion of the roughened nickel layer 12 to the metal base material 11 becomes inferior. If the glossiness is too large, the adhesion to other members becomes inferior. Note that, glossiness of 85° of the surface of the roughened nickel-layer 12 can be determined by measuring the specular gloss of 85° using a glossmeter in accordance with JIS 28741. Incidentally, the glossiness of 60° of the roughened nickel layer 12 famed on the outermost surface of the roughened nickel-plated sheet 1 of the present embodiment is usually 10 or less.

Although the chromaticity a*, b* of the surface of the roughened nickel layer 12 is not particularly limited, the chromaticity a* is preferably 0.1 to 3.0, more preferably 0.3 to 1.5, and the chromaticity b* is preferably 1.0 to 8.0, more preferably 2.0 to 7.0, from the viewpoint that the adhesion of the roughened nickel layer 12 to the metal base material 11 and the adhesion of the roughened nickel layer 12 to other members can be further improved.

The roughened nickel layer 12 may have the brightness L* of the surface and the glossiness of 85° of the surface within the above ranges, but the arithmetic mean roughness Ra is preferably 0.1 to 3 µm, from the viewpoint of improving the adhesion of the roughened nickel layer 12 to other members, the arithmetic mean roughness Ra is more preferably 0.18 µm or more, still more preferably 0.3 µm or more, and from the viewpoint of improving the adhesion (plating adhesion) of the roughened nickel layer 12 to the metal base material 11, the arithmetic mean roughness Ra is more preferably 1.8 µm or less, still more preferably 1.6 µm or less, even more preferably 1.3 µm or less. In addition, from the viewpoint of emphasizing production efficiency and production cost, the arithmetic average roughness Ra is preferably 0.18 to 0.5 µm, more preferably 0.18 to 0.49 µm. The roughened nickel layer 12 preferably has a ten-point mean roughness $Rz_{jis}$ of 2.0 to 20.0 µm, from the viewpoint of further improving the adhesion of the roughened nickel layer 12 to other members, the ten-point mean roughness $Rz_{jis}$ is more preferably 3 µm or more, still more preferably 4 µm or more, and even more preferably 5 µm or more, and from the viewpoint of further improving the adhesion (plating adhesion) of the roughened nickel layer 12 to the metal base material 11, the ten-point mean roughness $Rz_{jis}$ is more preferably 16 µm or less, still more preferably 14 µm or less, and even more preferably 12 µm or less. From the viewpoint of emphasizing production efficiencies and production costs, it is preferable that the ten-point mean roughness $Rz_{jis}$ is 3.0 to 7.0 µm. Note that, the maximum height roughness Rz of the roughened nickel layer 12 is not particularly limited, but is preferably 2.5 to 25.0 µm, more preferably 2.5 to 20.0 µm, and still more preferably 3.5 to 18.0 µm. The surface roughnesses Ra, $Rz_{jis}$, and Rz are preferably measured by laser microscopy.

The deposition amount of the roughened nickel layer 12 in the roughened nickel-plated sheet 1 of the present embodiment is not particularly limited, but is preferably 1.34 to 45.0 $g/m^2$, and from the viewpoint of further improving the adhesion (plating adhesion) of the roughened nickel layer 12, the deposition amount of the roughened nickel layer 12 is more preferably 2.67 $g/m^2$ or more, still more preferably 5 $g/m^2$ or more, and from the viewpoint of further improving the adhesion of the roughened nickel layer 12 to other members, the deposition amount of the roughened nickel layer 12 is more preferably 38.0 $g/m^2$ or less, still more preferably 32.0 $g/m^2$ or less, and even more preferably 31 $g/m^2$ or less. The deposition amount of the roughened nickel layer 12 can be obtained by measuring the total nickel amount of the roughened nickel-plated sheet 1 using a fluorescent X-ray apparatus. Incidentally, when an underlying metal plating layer 13 made of nickel to be described later is famed, after measuring the total amount of nickel using a fluorescent X-ray apparatus for the roughened nickel-plated sheet 1, it can be determined by subtracting the amount of nickel corresponding to the underlying metal plating layer 13 from the total amount of nickel. The amount of nickel corresponding to the underlying metal plating layer 13 can be measured, for example, by a method of measuring the thickness of the underlying metal plating layer 13 by cutting the roughened nickel-plated sheet 1 and observing the cross-section by a scanning electron microscope (SEM), then determining the amount of nickel converted from the thickness of the underlying metal plating layer 13, a method of measuring the amount of nickel on the metal base material 11 at the time of forming the underlying metal plating layer 13 using a fluorescent X-ray apparatus, a method of determining the amount of electrodeposition calculated from the coulomb amount when forming the underlying metal plating layer 13 by plating to the metal base material 11 and the like.

In the present embodiment, the method of setting the brightness L* and the glossiness of 85° of the surface of the roughened nickel layer 12 in the above ranges is not particularly limited, but a method of forming the roughened nickel layer 12 by the method described below, or the like, is exemplified.

Figure 2:
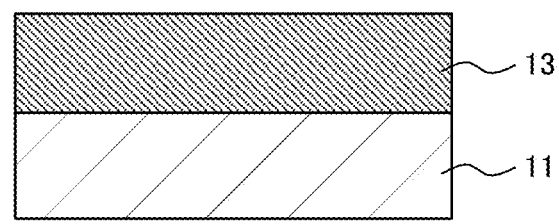
FIG. 2 is a first schematic view for explaining one example of a method for manufacturing a roughened nickel-plated sheet according to the present embodiment.
Figure 3:
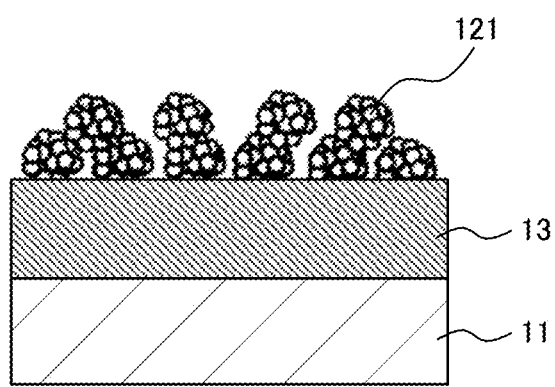
FIG. 3 is a second schematic view for explaining one example of a method for manufacturing a roughened nickel-plated sheet according to the present embodiment.
Figure 4:
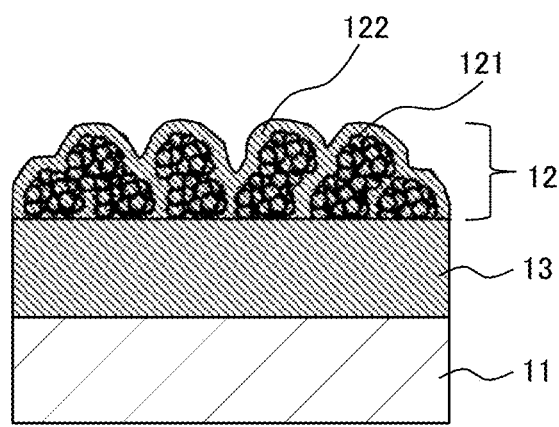
FIG. 4 is a third schematic view for explaining one example of a method for manufacturing a roughened nickel-plated sheet according to the present embodiment.

One example of a method of forming the roughened nickel layer 12 will be described below with reference to FIG. 2 to FIG. 4. First, as shown in FIG. 2, from the viewpoint of further improving the adhesion between the metal base material 11 and the roughened nickel layer 12 and imparting corrosion resistance according to the application, an underlying metal plating layer 13 is formed on the metal base material 11 as needed. Although the roughened nickel layer 12 may be formed directly on the metal base material 11 without forming the underlying metal plating layer 13, next, roughened nickel plating is performed to precipitate the nickel granules 121 on the metal base material 11 in an agglomerated state as shown in FIG. 3. Next, as shown in FIG. 4, covering nickel plating is further performed to coat the nickel granules 121 with the nickel film 122, thereby forming the roughened nickel layer 12 on the metal base material 11 with the underlying metal plating layer 13 famed as necessary interposed therebetween.

The condition of the roughened nickel plating for precipitating the nickel granules 121 in an agglomerated state is not particularly limited, but from the viewpoint that the brightness L* and the glossiness of 85° of the surfaces of the roughened nickel layers 12 can be suitably controlled within the above ranges, a method by electrolytic plating using a plating bath containing nickel sulfate hexahydrate at a concentration of 10 to 100 g/L and containing ammonium sulfate at a concentration of 1 to 100 g/L is preferable. The concentration of nickel sulfate hexahydrate in the plating bath used is preferably from 10 to 70 g/L, more preferably from 10 to 50 g/L, and still more preferably from 15 to 25 g/L. Note that, as a nickel ion source, nickel chloride hexahydrate may be applied or nickel chloride hexahydrate and nickel sulfate hexahydrate may be used in combination. When nickel chloride hexahydrate is used, the concentration of nickel chloride hexahydrate is preferably set to 1 to 40 g/L. However, when the nickel ion concentration and the chlorine ion concentration increase, an appropriate roughened shape having a predetermined brightness and glossiness becomes difficult to obtain, and therefore, care should be taken in combination with nickel sulfate hexahydrate and ammonium chloride. In addition, when ammonium sulfate is used as a source of ammonia in the plating solution, the concentration of ammonium sulfate in the plating bath used is preferably 10 to 50 g/L, more preferably 10 to 45 g/L, and still more preferably 15 to 40 g/L. Note that, the addition of ammonia to the nickel plating bath may be performed by adding ammonia water or by adding a salt such as ammonium sulfate and ammonium chloride. The concentration of ammonia in the plating bath is preferably 0.3 to 30 g/L, more preferably 1 to 20 g/L, still more preferably 3 to 15 g/L, and particularly preferably 3 to 12 g/L.

In addition, the pH of the nickel plating bath is preferably 4.0 to 8.0 when performing roughened nickel plating for precipitating the nickel granules 121 in an agglomerated state, from the viewpoint that the brightness L* and the glossiness of 85° of the surface of the roughened nickel layer 12 can be controlled more suitably. If the pH is too high, nickel ions in the bath tend to form a hydrate and cause plating failure, so that the upper limit thereof is more preferably 7.5 or less, and still more preferably 7.0 or less. When the pH is low, the bath resistance is low, and the nickel particles are less likely to precipitate in the state in which the secondary particles are famed, so that a normal precipitation form (flat plating) is likely to be famed and it is difficult to form a roughened nickel layer, it is more preferably 4.5 or more, still more preferably 4.8 or more, and particularly preferably 5.0 or more.

The current density when performing roughened nickel plating for precipitating the nickel granules 121 in an agglomerated state is preferably 5 to 40 A/dm$^2$ from the viewpoint that the brightness L* and the glossiness of 85° of the surface of the roughened nickel layer 12 can be controlled more suitably. When the current density is high, the precipitation efficiency tends to be lowered, and plating unevenness and surface roughness control unevenness tend to occur in the range of plating treatment, so that 30 A/dm$^2$ or less is more preferable, still more preferably 25 A/dm$^2$ or less, and particularly preferably 20 A/dm$^2$ or less, in order to secure a large plating area of 100 cm$^2$ or more in particular. When the current density is low, the nickel particles are less likely to precipitate in the form of the secondary particles, and the nickel particles are more likely to be in the normal precipitation form, and therefore, the roughened nickel layers are less likely to be famed. Therefore, it is more preferable that the current density is 10 A/dm$^2$ or more. In the present embodiment, from the viewpoint of controlling the brightness L* and the glossiness of 85° of the roughened nickel layer 12 more suitably, it is preferable to control the current density in accordance with the nickel ion concentration in the nickel plating bath (controlled by nickel sulfate hexahydrate (g/L) in the plating bath in the Examples described later), the temperature of the nickel plating bath, the pH of the nickel plating bath, the ammonia concentration in the nickel plating bath, the halogen atomic concentration in the nickel plating bath, and the like.

The bath temperature of the nickel plating bath at the time of performing the roughened nickel plating is not particularly limited, but is preferably 25 to 60° C., more preferably 25 to 50° C., and still more preferably 30 to 50° C., from the viewpoint that the brightness L* and the glossiness of 85° of the surfaces of the roughened nickel layers 12 can be controlled more suitably.

In the present embodiment, when performing roughened nickel plating for precipitating the nickel granules 121 in a state of being agglomerated, it is preferable to perform plating while stirring the nickel plating. By stirring the nickel plating bath, the nickel granules 121 are easily precipitated uniformly on the metal base material 11 while being agglomerated, whereby the brightness L* and the glossiness of 85° of the surface of the roughened nickel layer 12 can be controlled more suitably. The method of performing stirring is not particularly limited, and examples thereof include a method such as bubbling and pump circulation. As a condition of bubbling, there is no particular limitation on the type of gas, but air is preferably used as a gas from the viewpoint of versatility, and as a timing for supplying a gas, continuous aeration is preferable for stably stirring. As the aeration amount, since the targeted roughened shape is hardly obtained when stirring is too strong, for example, the aeration amount is preferably 1 L/min or less with respect to the plating solution of the volume 2 L. As a condition of the pump circulation, continuous circulation is preferable in order to stably stir.

The precipitation amount at the time of precipitating the nickel granules 121 in an agglomerated state by roughened nickel plating is not particularly limited, but is preferably 0.89 to 4.45 g/m² from the viewpoint of controlling the brightness L* and glossiness of 85° of the surfaces of the roughened nickel layer 12 to the above ranges, and from the viewpoint of further improving the adhesiveness of the nickel layer 12 to other members, the precipitation amount at the time of precipitating the nickel granules 121 in an agglomerated state is more preferably 1.34 g/m² or more, still more preferably 1.60 g/m² or more, and from the viewpoint of further improving the adhesiveness (plating adhesiveness) of the roughened nickel layer 12 to the metal base material 11, the precipitation amount at the time of precipitating the nickel granules 121 in an agglomerated state is more preferably 4.01 g/m² or less, still more preferably 3.56 g/m² or less, and particularly preferably 3.12 g/m² or less. In addition, from the viewpoint of emphasizing production efficiencies and production costs, it is preferable that the precipitation amount is 1.34 to 2.23 g/m² when the nickel granules 121 are precipitated in the agglomerated state.

Then, in the manufacturing method of the present embodiment, the nickel granules 121 are precipitated by roughened nickel plating in an agglomerated state, and then the nickel granules 121 are coated with the nickel film 122 by further performing a covering nickel plating. Covering nickel plating for coating the nickel particulate 121 with the nickel film 122 may be performed by any plating method of electrolytic plating or electroless plating, but it is preferably formed by electrolytic plating.

When the covering nickel plating is performed by the electrolytic plating method, for example, as the nickel plating bath, Watts bath having a bath composition of 200 to 350 g/L of nickel sulfate hexahydrate, 20 to 60 g/L of nickel chloride hexahydrate, and 10 to 50 g/L of boric acid may be used, and nickel plating may be performed under the conditions of pH of 3.0 to 5.0, bath temperature of 40 to 70° C., current density of 5 to 30 A/dm² (preferably 10 to 20 A/dm²), followed by washing with water.

The deposition amount of nickel film 122 (coverage amount) to cover nickel granules 121 with nickel film 122 is not particularly limited. However, from the viewpoint that the brightness L* and the glossiness of 85° of the surfaces of the roughened nickel layers 12 can be suitably controlled within the above ranges, the brightness L* and the glossiness of 85° of the surfaces of the roughened nickel layers 12 can be suitably controlled within the above ranges is preferably 4.45 to 26.70 g/m², and from the viewpoint of further improving the adhesiveness (plating adhesiveness) of the roughened nickel layer 12, the deposition amount nickel film 122 (coverage amount) to cover nickel granules 121 with nickel film 122 is more preferably 6.23 g/m² or more, and from the viewpoint of further improving the adhesiveness of the roughened nickel layer 12 to other members, the deposition amount nickel film 122 (coverage amount) to cover nickel granules 121 with nickel film 122 is more preferably 19.58 g/m² or less, and still more preferably 16.02 g/m² or less. In addition, from the viewpoint of emphasizing production efficiencies and production costs, the deposition amount nickel film 122 to cover nickel granules 121 with nickel film 122 is more preferably is 4.45 to 8.90 g/m². Further, the ratio between of the amount of deposition by the roughened nickel plating and the amount of deposition by the covering nickel plating is not particularly limited, but "the amount of deposition by the roughened nickel plating: the amount of deposition by the covering nickel plating" in the weight ratio, preferably 1:2 to 1:14, more preferably 2:4.5 to 2:15, still more preferably 2:5 to 2:15. Note that, in the case where the underlying nickel layer is formed as the underlying metal plating layer 13, when the covering nickel plating is performed, in addition to the covering of the nickel granules 121 with the nickel film 122, a part thereof contributes to the growth of the underlying nickel layer (thickening of a portion where the underlying layer is exposed without the nickel granules). Therefore, in this case, the above-mentioned amount of deposition is the sum of the amount of coating by the nickel film 122 by the covering nickel plating and the amount of forming the underlying nickel layer by the covering nickel plating.

Further, in the present embodiment, from the viewpoint of further improving the adhesion between the metal base material 11 and the roughened nickel layer 12, it is preferable to form an underlying metal plating layer 13 between the metal base material 11 and the roughened nickel layer 12, as the underlying metal plating layer 13, a nickel plating layer or copper plating layer is preferable, a nickel plating layer is more preferable. In particular, the nickel granules 121 famed by the roughened nickel plating described above are in a state in which the particulate precipitates are aggregated and precipitated in the form of protrusions and exist as aggregates, and it is preferable to have gaps between the aggregates from the viewpoint of adhesion to other members, and therefore, there are cases in which the entire surface of the metal base material 11 is not completely covered. Therefore, for example, in the case of using a steel sheet as the metal base material 11, in order to improve the effect of suppressing the occurrence of rust of the steel sheet, it is preferable to provide the underlying metal plating layer 13. Incidentally, for the purpose of such an effect of improving the corrosion resistance, it is preferable to select the metal base material 11 according to the application and to perform an underlying plating process corresponding thereto. When using a steel sheet or copper as the metal base material 11, as the underlying metal plating layer 13, it is preferable to form an underlying nickel plating layer or an underlying copper plating layer. Further, when applying the nickel layer by electrolytic nickel plating to the underlayer plating process, good compatibility with the subsequent coating plating process, it is possible to further enhance the plating adhesion of the roughened nickel layer 12. Although the effect of plating adhesion is obtained only by covering nickel plating process in a state where there is no underlying metal plating layer 13, since the covering nickel plating process tends to preferentially nickel precipitated on the nickel granules 121, from such a point of view, it is preferable to form the underlying metal plating layer 13 in order to improve corrosion resistance. When the metal base material 11 is a copper sheet, it is also possible to further enhance the plating adhesion of the roughened nickel layer 12 by performing an acid treatment or the like as the pre-treatment.

The underlying metal plating layer 13 can be formed by plating the metal base material 11 in advance before forming the roughened nickel layer 12 on the metal base material 11. In the case where the underlying metal plating layer 13 is the nickel plating layer, the nickel plating layer may be famed using any plating method of electrolytic plating or electroless plating, it is preferable to form by electrolytic plating.

In the case where the underlying metal plating layer 13 is the nickel plating layer, when an electrolytic plating method is used as a method for forming the base nickel plating layer, for example, as the nickel plating bath, Watts bath having a bath composition of 200 to 350 g/L of nickel sulfate hexahydrate, 20 to 60 g/L of nickel chloride hexahydrate, and 10 to 50 g/L of boric acid may be used, and nickel plating may be performed under the conditions of pH of 3.0 to 5.0, bath temperature of 40 to 70° C., current density of 5 to 30 A/dm² (preferably 10 to 20 A/dm²), followed by washing with water.

When the underlying metal plating layer 13 is formed, the deposition amount of the roughened nickel layer 12 in the roughened nickel-plated sheet 1 of the present embodiment is preferably 26.70 g/m² or less, more preferably 4.45 to 22.25 g/m², still more preferably 4.45 to 17.80 g/m², and particularly preferably 4.45 to 13.35 g/m² from the viewpoint of further improving the adhesion between the metal base material 11 and the roughened nickel layer 12.

When forming the underlying metal plating layer 13, the total deposition amount of the roughened nickel layer 12 and the underlying metal plating layer 13 in the roughened nickel-plated sheet 1 of the present embodiment is not particularly limited, but is preferably 5.0 to 50.00 g/m², more preferably 12.02 to 50.00 g/m², still more preferably 12.28 to 40.94 g/m², and particularly preferably 12.28 to 32.49 g/m² from the viewpoint of improving the adhesion of the roughened nickel layer 12 to the metal base 11 and the adhesion of the roughened nickel layer 12 to other members. In addition, from the viewpoint of emphasizing production efficiencies and production costs, it is preferable that the total deposition amount of the roughened nickel layer 12 and the underlying metal plating layer 13 is 10.24 to 22.25 g/m². Further, when high corrosion resistance is required, and particularly when high adhesion of the roughened nickel layer 12 to the metal base material 11 and adhesion of the roughened nickel layer 12 to other members are required, the total deposition amount of the roughened nickel layer 12 and the underlying metal plating layer 13 is preferably 32.50 to 57.85 g/m². The total deposition amount of the roughened nickel layer 12 and the underlying metal plating layer 13 can be obtained by measuring the total amount of nickel of the roughened nickel-plated sheet 1 using a fluorescent X-ray apparatus.

As described above, according to the present embodiment, as shown in FIG. 3, the nickel granules 121 are precipitated on the metal base material 11 by roughened nickel plating in an agglomerated state, and then, as shown in FIG. 4, the nickel granules 121 are coated with the nickel film 122 by further covering nickel plating, and the brightness L* and the glossiness of 85° of the surfaces of the roughened nickel layer 12 can be controlled in the above ranges.

In particular, when roughened nickel plating is performed, or when covering nickel plating is further performed after roughened nickel plating, as shown in FIG. 3, an aggregate of protrusions (columns) composed of secondary particles (nickel granules 121) in which primary particles are aggregated is famed. To this, the present inventors have studied, and, as a result, the following findings have been obtained.

That is, in the above case, by adjusting the plating conditions, it is possible to control the size, shape and density of the protruding aggregate, thereby, it was found that it is possible to achieve both good plating adhesion to the metal base material 11 and good adhesion to other members appropriately. In addition, although there is $Rz_{jis}$ as a parameter representing the height difference in the surface, it has been found that the adhesion to other members and the adhesion of the roughened nickel layer 12 cannot be controlled by simply only adjusting $Rz_{jis}$ or other parameters representing roughness such as Ra and Rz. That is, as the tendency, while it is possible to ensure adhesion to other members by a certain degree of difference in height ($Rz_{jis}$), if the difference in height ($Rz_{jis}$) is too large, the adhesion of the roughened nickel layer 12 to the metal base material 11 tends to deteriorate. In particular, however, it has been found that the adhesion of the roughened nickel layer 12 to the metal base material 11 is not simply determined by $Rz_{jis}$ alone. In addition, it was found that the density of the protruding aggregate in the roughened nickel layer 12 was too high to allow resin or the like to enter between the protruding aggregate and to ensure the adhesiveness to other members such as a resin film or the like. On the other hand, it has been found that when the density of the protruding aggregate is too low, the individual protruding aggregates are liable to be finely broken, and the adhesiveness of the roughened nickel layer 12 to the metal base material 11 is likely to be lowered, or the protruding aggregates themselves are too small to obtain the anchor effect, and the adhesiveness to other members such as the resin film is not obtained. On the other hand, it has been difficult to measure the size, shape, and density of such a protruding aggregate and to specify a suitable range thereof.

In such a circumstance, the present inventors have further investigated that, as parameters for replacing such sizes, shapes, and densities, focusing on the two parameters of the brightness L* and the glossiness of 85° of the roughened nickel layer 12, both the brightness L* and the glossiness of 85° are found to be in specified ranges when the adhesiveness of the roughened nickel layer 12 to the base material and the adhesiveness to other members are good.

In particular, although it is generally known that the numerical value of the brightness L* fluctuates depending on the unevenness of the sheet surface, in the protruding aggregate formed of the secondary particles (nickel-particulate matter 121) as shown in FIG. 3, the present inventors have found that not only the size ($Rz_{jis}$) of the protrusion but also the size of the primary particles of the plated particles at the tip of the protrusion have greatly affect. That is, it is found that the brightness L* varies by changing the surface shape of the tip of the protruding aggregate due to the size of the particle size of the primary particle.

Furthermore, the present inventors have found a problem that the adhesion of the roughened nickel layer 12 to the metal base material 11 may be inferior even if the brightness L* is within a suitable range. In particular, in such cases, it is considered that the plating particles on the surfaces of the protruding aggregates are large and relatively smooth, so that the brightness L* is in a suitable range, while the plating particles are large and porous, so that the plating particles are easily detached from the metal base material 11. One of the reasons for this is considered to be that, when the plated particles are large, the protruding aggregates tend to break and fall off because $Rz_{jis}$ tends to be high. Measuring the plating particles are those very time consuming, in the case of such plating particles is large, the glossiness measured at a low angle of incidence light with respect to the plated sheet of glossiness of 85° is found together to be extremely low.

Based on such knowledge, the present inventors have conceived a roughened nickel-plated sheet 1 in which the brightness L* and the glossiness of 85° of the roughened nickel layers 12 fall within the above-mentioned specified ranges.

As described above, in the present embodiment, as the roughened nickel layer 12, aggregates having a protrusion-like shape (columnar shape) is provided on the surface, so that adhesion to other members such as a resin film can be ensured. Then, the present inventors have investigated that the plating layer having such protruding aggregate can be famed by performing plating under the situation of conducting current under the condition that the supply of nickel ions is insufficient with respect to the plating current. That is, it can be formed by insufficient supply of nickel ions with respect to the plating current to cause abnormal electrodeposition.

On the other hand, in such abnormality electrodeposition, since the embodiment of abnormal electrodeposition changes depending on the nickel concentration in the plating solution, the bath temperature of the plating solution, the pH of the plating solution, the current density at the time of plating, and the like, it was difficult to obtain a roughened nickel plated sheet that satisfies both the adhesiveness of the roughened nickel layer 12 to the metal base material 11 and the adhesiveness of the roughened nickel layer 12 to other members at the same time by simply performing plating under the condition that causes abnormal electrodeposition. In particular, according to the method of abnormal electrodeposition, since the unevenness is easily famed, while easy adhesion to other members can be obtained, easily precipitated plating particles fall off, there is a case that falls off during handling. On the other hand, the present inventors have found that, in order to solve the problem of simultaneously satisfying both the adhesiveness of the roughened nickel layer 12 to the metal base material 11 and the adhesiveness of the roughened nickel layer 12 to other members, the size of the primary particles, the size of the protruding aggregate, and the shape of the protruding aggregate constituting the roughened nickel layer 12 are important.

Figure 5A:
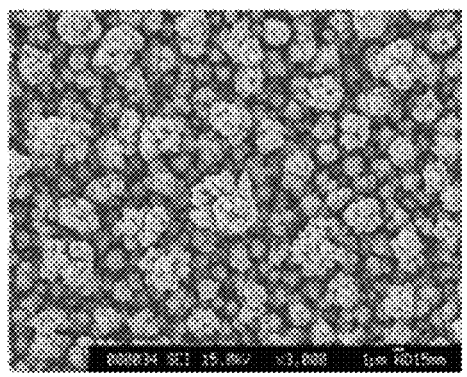
FIG. 5(A) and FIG. 5(B) are images obtained by observing a surface of a roughened nickel-plated sheet of Example 28 by a scanning electron microscope (SEM)
Figure 5B:
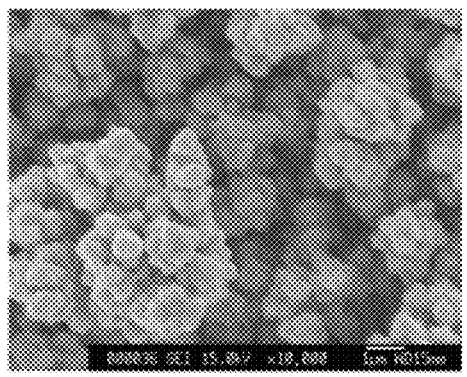
Figure 5C:
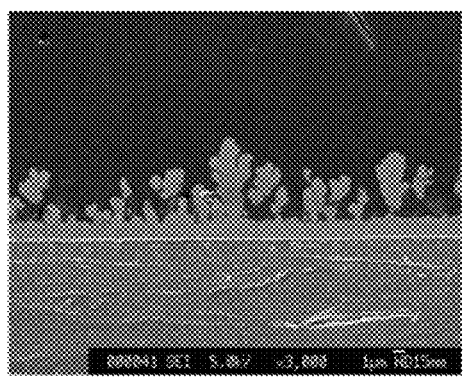
FIG. 5(C) and FIG. 5(D) are images obtained by observing a cross-section of a roughened nickel-plated sheet of Example 28 by scanning electron microscope (SEM).
Figure 5D:
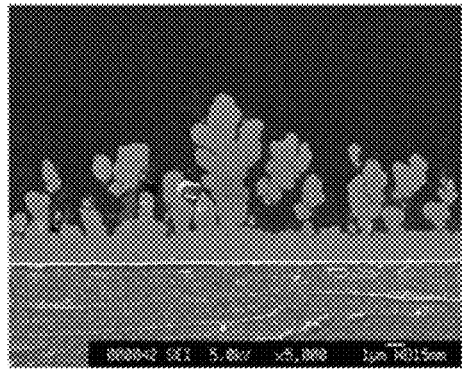
Figure 7A:
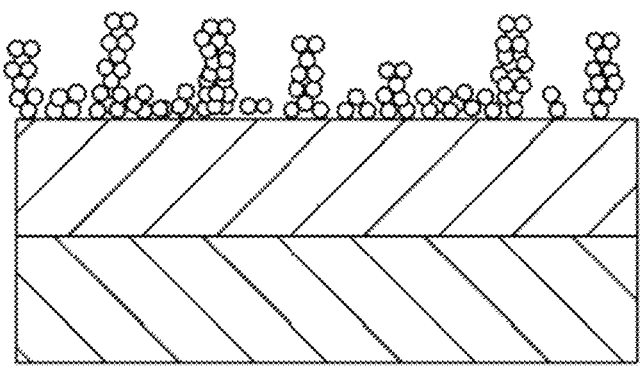
FIG. 7(A) and FIG. 7(B) are schematic diagrams showing one embodiment of a roughened nickel layer.
Figure 7B:
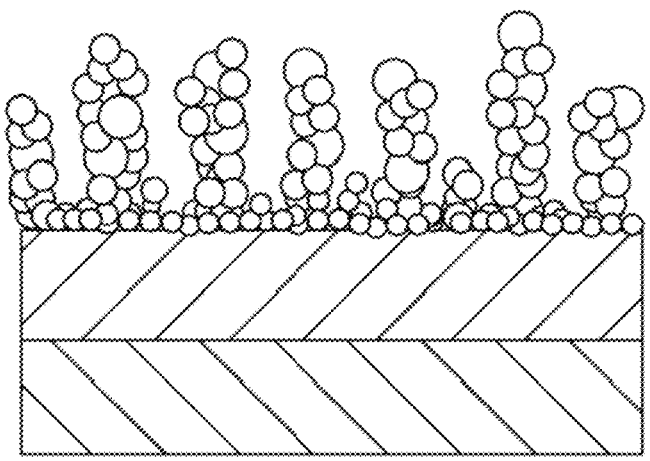
Figure 14A:
FIG. 14(A) and FIG. 14(B) are scanning electron microscope (SEM) photographs of a cross-section of a roughened nickel layer.
Figure 14B:
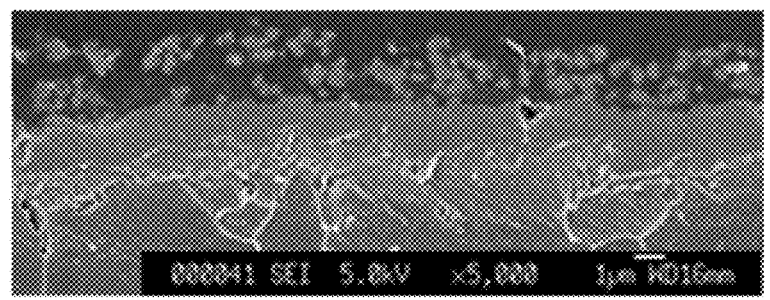

Here, FIG. 7(B) is a diagram showing a specific mode of the roughened nickel layer 12 according to the present embodiment, and is a schematic diagram based on an SEM photograph of the roughened nickel layer 12 shown in FIG. 5(D) and FIG. 14(A). Further, FIG. 7 (A) is a diagram showing an aspect of the plating layer obtained by the roughened nickel plating, and is a schematic diagram based on the SEM photograph shown in FIG. 14 (B). The embodiment as shown in FIG. 7(B) is obtained by forming a plating layer of the embodiment as shown in FIG. 7(A) by roughened nickel plating, and then applying covering nickel plating to the plating layer. Incidentally, in FIG. 7(A) and FIG. 7(B), the case where the underlying nickel plating layer is famed is exemplified, but it is not particularly limited to the embodiment where the underlying nickel plating layer is formed (the same applies to FIG. 8(A) to FIG. 8(C), FIG. 9(A) to FIG. 9(D), and FIG. 10(A) to FIG. 10(D)).

That is, according to the findings of the present invention inventors, as the roughened nickel layer 12, by the embodiment as shown in FIG. 7(B), specifically, by satisfying the below conditions (1) to (4), it has been found that the above-mentioned problems can be solved. That is, (1) the primary particles forming the protruding aggregate are not too small and have an appropriate size (the mean particle diameter of the primary particles is preferably 0.3 to 3.0 µm, more preferably 0.5 to 2.0 µm), (2) the shape of the aggregate of the secondary particles on which such primary particles are aggregated is protrusions or columns, (3) the height of the aggregate is not too low and not too high (the height is preferably 1 to 20 µm, more preferably 2 to 15 µm, from the view point of emphasizing the production efficiency and the production cost, particularly preferably 2.0 to 10.0 µm), and (4) the existence density of the aggregate is not too small (the aggregate is not too close to each other (the distance is not too small and the aggregate is not too close to each other). If the primary particles are too small, the adhesion (bonding) between the primary particles becomes poor, and the plating adhesion decreases. If the primary particles are too large, it becomes impossible to take a protrusion or a columnar manner, or locally protrusions will be excessively grown, the protrusions are likely to break due to an external force or the like, as a result, the plating adhesion becomes a poor state.

Here, the term "not too small and having an appropriate size" means, more specifically, as confirmed by the cross-sectional SEM images of the roughened nickel layer 12 shown in FIG. 5(C) and FIG. 5(D), a state in which 70% or more of the whole of the primary particles constituting the protruding or columnar secondary particles are composed of primary particles having a particle diameter of 0.3 to 3.0 µm, more preferably are composed of primary particles having a particle diameter of 0.5 to 2.0 µm. Incidentally, 70% or more of the whole described above means that 70% or more of the cross-sectional area of the total primary particles is the area derived from the particles having the above particle size range. In addition, although it is difficult to derive the particle diameter of each particle from the cross-sectional SEM image, when the particle diameter of the primary particles constituting the secondary particles is too small, the ratio of the particle having the particle diameter of less than 0.3 µm becomes obviously 70% or more, so that clear identification is possible.

Further, according to the embodiment as shown in FIG. 7(B), it has been found that the brightness L* and the glossiness of 85° fall within the predetermined range of the present invention, and both the adhesiveness of the roughened nickel layer 12 to the metal base 11 and the adhesiveness to other members are satisfied at the same time.

On the other hand, in the embodiment shown in FIG. 7(A) in which the covering nickel plating is not performed, since the primary particles are very fine or the height of the protruding aggregate is low, the brightness L* falls outside the predetermined range of the present invention, and the adhesiveness of the roughened nickel layer 12 to the metal base material 11 or the adhesiveness to other members is inferior. Note that the embodiment shown in FIG. 7(A) is an embodiment corresponding to Comparative Examples 11 to 16 and 34 described later.

Figure 8A:
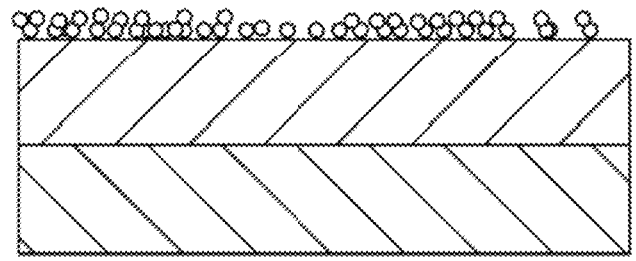
FIG. 8(A) to FIG. 8(C) are schematic diagrams showing one embodiment of a roughened nickel layer.
Figure 8B:
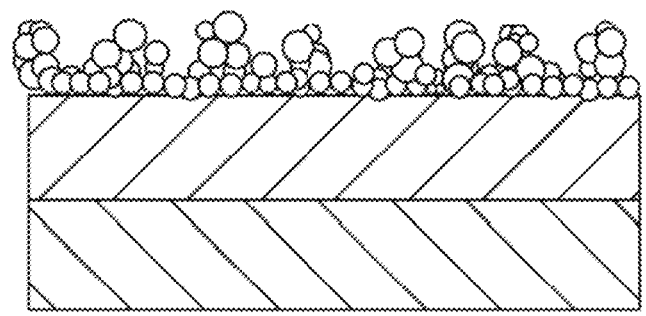
Figure 8C:
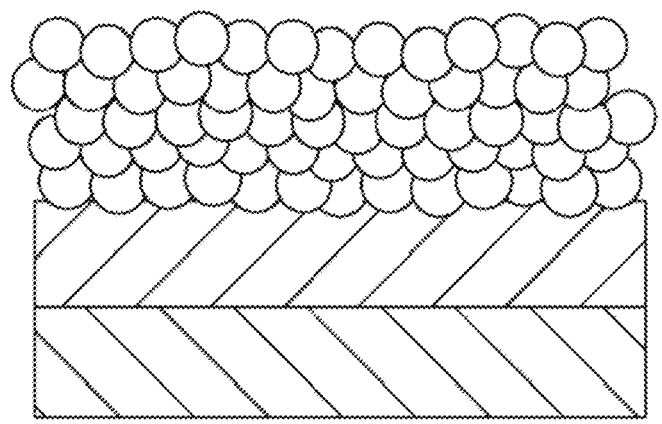

In addition, in the embodiment shown in FIG. 8 (A), in the embodiment shown in FIG. 8 (B) obtained by applying covering nickel plating thereto, and in the embodiment shown in FIG. 8 (C) in which the roughened nickel layer is not famed, the height of the protruding aggregate is low or the protruding aggregate itself is not famed, the brightness L* falls outside the predetermined range of the present invention, and the adhesiveness of the roughened nickel layer 12 to the metal base material 11 or the adhesiveness to other members is inferior. The embodiment shown in FIG. 8(A) is the embodiment corresponding to Comparative Examples 17 to 20 described later, and the embodiments shown in FIG. 8(B) and FIG. 8(C) are embodiments corresponding to the Comparative Examples 1 to 4, 33, 37 to 39 described later.

Figure 9A:
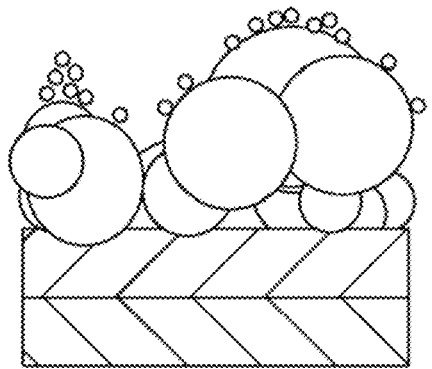
FIG. 9(A) to FIG. 9(D) are schematic diagrams showing one embodiment of a roughened nickel layer.
Figure 9B:
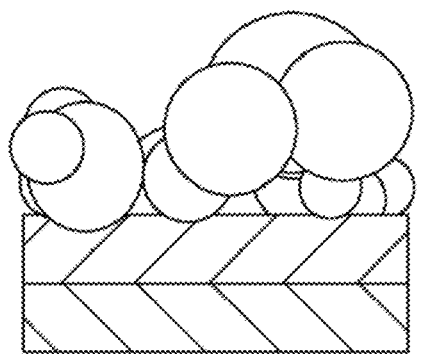

Further, the embodiment shown in FIG. 9(A), and in the embodiment shown in FIG. 9(B) obtained by applying covering nickel plating thereto, since the influence of the unevenness of the surface of the underlying nickel plating layer or the influence of coarsening of the secondary particle contained in the roughened nickel layer is large, in the embodiment shown in FIG. 9(A), glossiness of 85° becomes outside the predetermined range of the present invention, and it becomes inferior to the adhesion of the roughened nickel layer 12 to the metal base material 11. Further, in the embodiment shown in FIG. 9(B), the brightness L* is outside the predetermined range of the present invention, and it becomes inferior in adhesion to the other members. The embodiment shown in FIG. 9(A) is the embodiment corresponding to Comparative Example 24 described later, and the embodiment shown in FIG. 9(B) is the embodiment corresponding to Comparative Example 10 described later.

Figure 9C:
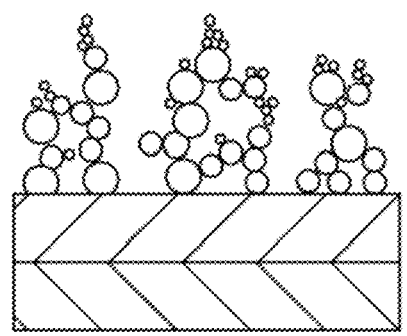
Figure 9D:
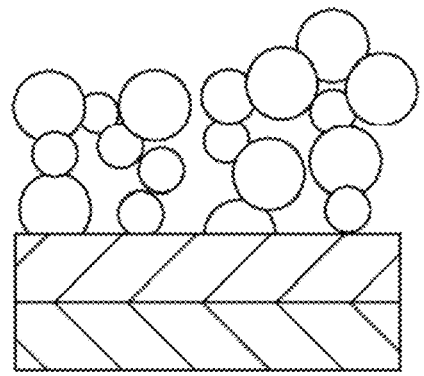

In addition, in the embodiment shown in FIG. 9(C), and in the embodiment shown in FIG. 9(D) obtained by applying covering nickel plating thereto, as an aggregate, an aggregate having voids or a porous aggregate is formed, and the glossiness of 85° becomes outside the predetermined range of the present invention, and the adhesion of the roughened nickel layer 12 to the metal base material 11 is inferior. The embodiment shown in FIG. 9(C) is the embodiment corresponding to Comparative Examples 30, 31 described later, the embodiment shown in FIG. 9(D) is the embodiment corresponding to Comparative Examples 8, 9 described later.

Figure 10A:
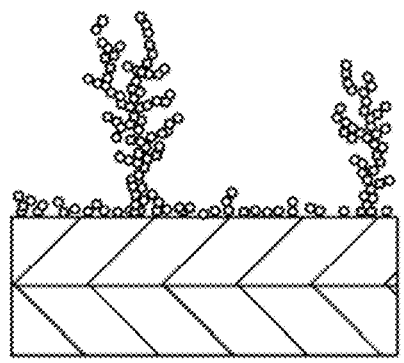
FIG. 10(A) to FIG. 10(D) are schematic diagrams showing one embodiment of a roughened nickel layer.
Figure 10B:
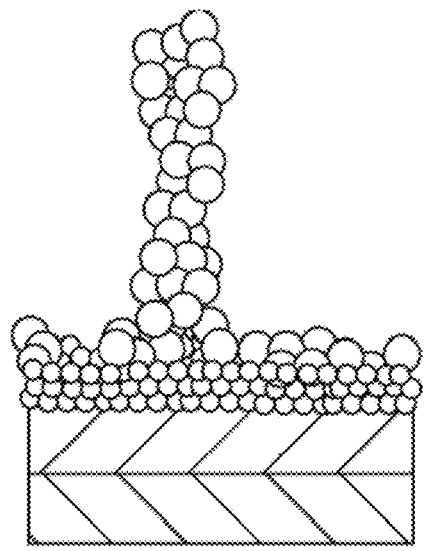

Further, in the embodiment shown in FIG. 10(A), and in the embodiment shown in FIG. 10(B) obtained by applying covering nickel plating thereto, since the height of the protruding aggregate is too high and the formation density of the protruding aggregate is low, the brightness L* becomes outside the predetermined range of the present invention, and the adhesion of the roughened nickel layer 12 to the metal base material 11 is inferior. The embodiment shown in FIG. 10(A) is the embodiment corresponding to Comparative Examples 21 to 23, 25 to 29, 35, 36 described later, the embodiment shown in FIG. 10(B) is the embodiment corresponding to Comparative Example 5 described later.

Figure 10C:
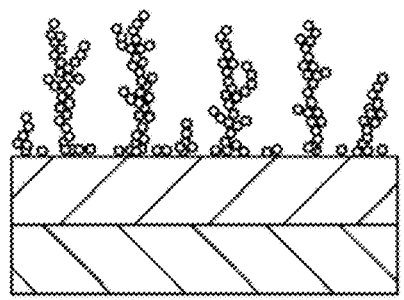
Figure 10D:
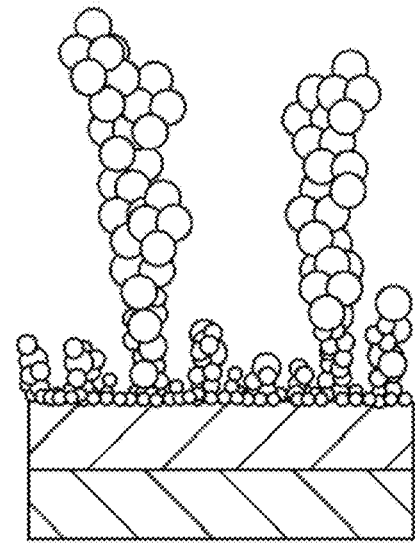

Further, in the embodiment shown in FIG. 10(C), and in the embodiment shown in FIG. 10(D) obtained by applying covering nickel plating thereto, the height of the protruding aggregate is too high, and the brightness L* and the 85° gloss are outside the predetermined range of the present invention, and the adhesion of the roughened nickel layer 12 to the metal base material 11 is inferior. The embodiment shown in FIG. 10(C) is the embodiment corresponding to Comparative Example 32 described later, the embodiment shown in FIG. 10(D) is the embodiment corresponding to Comparative Examples 6, 7 described later.

Then, the present inventors have been found that, in the above embodiments in FIG. 7(A), FIG. 8(A) to FIG. 8(C), FIG. 9(A) to FIG. 9(D), and FIG. 10(A) to FIG. 10(D), any of the brightness L* and glossiness of 85° becomes outside the predetermined range of the present invention, and any one of the adhesion of the roughened nickel layer 12 to the metal base material 11 and the adhesion to other members becomes inferior. Further, in contrast, according to the embodiment shown in FIG. 7(B), the present inventors have been found that the brightness L* and glossiness of 85° becomes within the predetermined range of the present invention, and both the adhesion of the roughened nickel layer 12 to the metal base material 11 the adhesion to other members and can be satisfied at the same time.

The method of forming the roughened nickel layer 12 as shown in FIG. 7(B) includes the above-mentioned method, and in this case, for example, it is inferred that the roughened nickel layer 12 as shown in FIG. 7(B) is famed through a precipitation step and a growth step described below. That is, first, as described above, as the roughened nickel plating, by passing an appropriate current in the dilute nickel aqueous solution (applying a voltage) to excite the precipitation, it is possible to precipitate the metallic nickel at once from a number of nuclei, and it is possible to suppress the growth in the plane direction of the precipitated particles to some extent. At this time, since the nuclei of the primary particles tend to precipitate preferentially on the convex portions famed by the precipitated particles, as a result, the primary particles of the plated granules are stacked in the height direction, and the shape of the secondary particles in which the primary particles are aggregated can be made to be a protrusion. However, even if such an aggregate is famed, when the primary particles are too small as shown in FIG. 7(A), the contact surface between the primary particles is too small, so that the primary particles are liable to peel off. Therefore, as described above, after the roughened nickel plating, the covering nickel plating is performed. Here, although the term "covering" is used, according to studies by the present inventors, it has been confirmed that, according to such covering nickel plating, in addition to precipitation that covers the primary particles famed by roughened nickel plating, grain growth in which the primary particles grow actually occurs. In particular, it is considered that the growth of such primary particles by covering nickel plating occurs not only on the top surface of the protruding aggregate but also on the particles on the side surface of the aggregate and the particles inside the aggregate. As a result, it is considered that the primary particles have an appropriate size, whereby the adhesion between the primary particles is improved, and the thickness of the protruding aggregate is also increased and it is difficult to break. Therefore, the roughened nickel layer 12, which is the embodiment shown in FIG. 7(B), has good adhesion of the roughened nickel layer 12 to the metal base material 11. In addition, since the roughened nickel layer 12 has a protruding aggregate which has an appropriate height, it is also excellent in adhesion to other members.

In the present embodiment, as a method for forming the roughened nickel layer as shown in FIG. 7(B), a method of applying covering nickel plating after the roughened nickel plating, if satisfying the conditions (1) to (4) described above after roughened nickel plating, naturally the brightness L* and glossiness of 85° becomes within the predetermined range of the present invention, the roughened nickel-plated sheet which is excellent in the adhesion of the roughened nickel layer 12 to the metal base material 11 and the adhesion to the other member can be obtained. Therefore, it may be omitted covering nickel plating step.

Figure 11A:
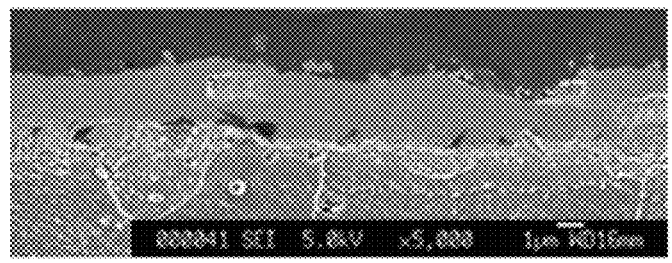
FIG. 11(A) to FIG. 11(C) are scanning electron microscope (SEM) photographs of a cross-section of a roughened nickel layer.
Figure 11B:
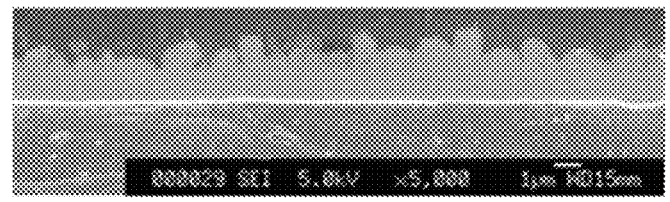
Figure 11C:
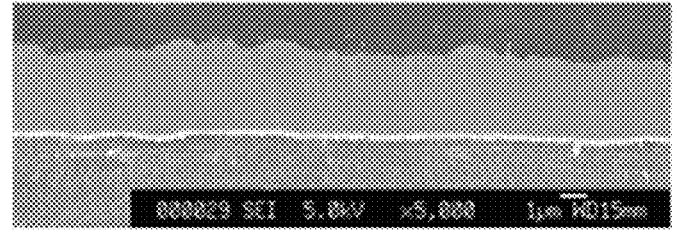
Figure 12A:
FIG. 12(A) to FIG. 12(C) are scanning electron microscope (SEM) photographs of a cross-section of a roughened nickel layer.
Figure 12B:
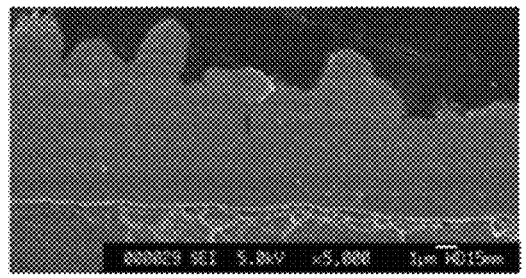
Figure 12C:
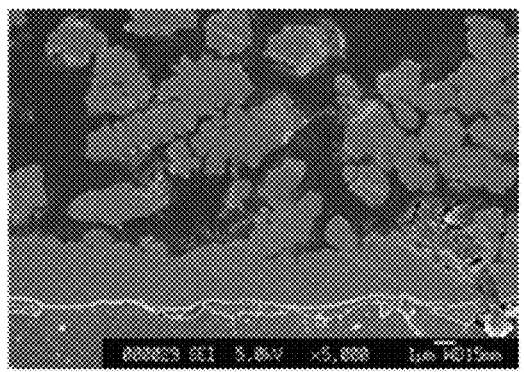
Figure 13A:
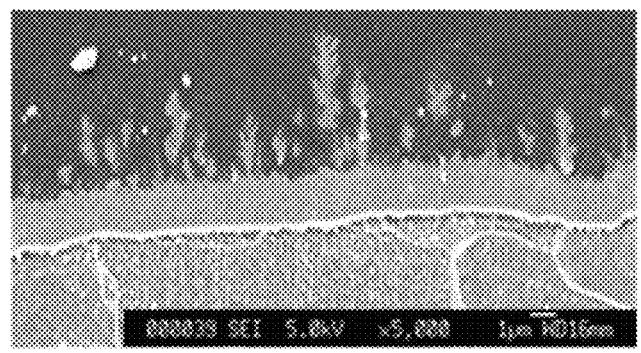
FIG. 13(A) and FIG. 13(B) are scanning electron microscope (SEM) photographs of a cross-section of a roughened nickel layer.
Figure 13B:
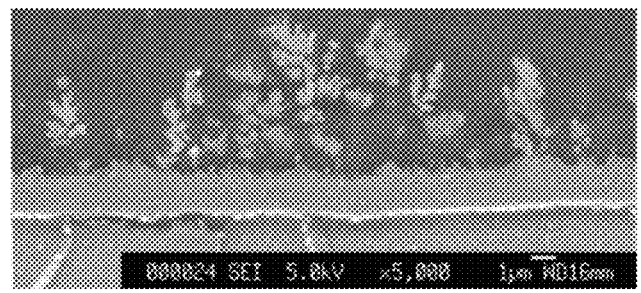

Note that, a cross-sectional SEM photograph of the roughened nickel layer according to the embodiment shown in FIG. 8(A) is shown in FIG. 11(A). A cross-sectional SEM photograph of the roughened nickel layer according to the embodiment shown in FIG. 8(B) is shown in FIG. 11(B). A cross-sectional SEM photograph of the roughened nickel layer according to the embodiment shown in FIG. 8(C) is shown in FIG. 11(C). A cross-sectional SEM photograph of the roughened nickel layer according to the embodiment shown in FIG. 9(A) is shown in FIG. 12(A). A cross-sectional SEM photograph of the roughened nickel layer according to the embodiment shown in FIG. 9(B) is shown in FIG. 12(B). A cross-sectional SEM photograph of the roughened nickel layer according to the embodiment shown in FIG. 9(C) is shown in FIG. 12(C). A cross-sectional SEM photograph of the roughened nickel layer according to the embodiment shown in FIG. 10(A) is shown in FIG. 13(A). A cross-sectional SEM photograph of the roughened nickel layer according to the embodiment shown in FIG. 10(C) is shown in FIG. 13(C).

According to the roughened nickel-plated sheet 1 of the present embodiment as described above, since the adhesion of the roughened nickel layer 12 to the metal base material 11 is good and the adhesion to other members is excellent, it can be used as applications used by bonding with other members, for example, various containers where the adhesion to various members such as resin and active material, electronic device member (such as a substrate), the battery member (outer package, current collector, tab lead).

In particular, the roughened nickel-plated sheet 1 of the present embodiment, since the adhesion of the roughened nickel layer 12, i.e., the adhesion to the base material 11 is excellent, for example, even if the plated sheets overlap or contact, the roughened nickel layer 12 in the surface is difficult to peel off or fall off, and it can be suitably used as a roughened nickel-plated sheet 1 having a roughened nickel layer 12 on the outermost surface of both surfaces as shown in FIG. 1A.

On the other hand, if the adhesion to the other member is required only one side of the plated sheet, it is sufficient that the roughened nickel layer 12 is formed only on one side as in the roughened nickel-plated sheet 1 shown in FIG. 1B. At the surface without forming the roughened nickel layer 12, although the metal base material 11 will be located on the outermost surface, when the metal base material 11 is a steel sheet, it may remain untreated steel sheet, or surface treatment such as nickel plating, galvanizing, and chemical conversion treatment may be subjected according to the properties required. In particular, when resistance to an alkaline solution is required, a roughened nickel-plated steel sheet in which a normal nickel plating layer (e.g., a nickel plating layer famed under the above-mentioned conditions for forming an underlying nickel plating layer) is famed on the surface on which the roughened nickel layer 12 is not formed, and by forming the normal nickel plating layer, both surfaces of the metal base material 11 becomes to be covered with a nickel layer, which is preferable.

When producing the roughened nickel-plated sheet 1 as shown in FIG. 1B, for example, in the step of performing the roughened nickel plating, the roughened nickel-plated sheet having a roughened nickel layer 12 only on one side can be obtained by a method of performing plating without electrification on the surface of the side that does not form the roughened nickel layer 12, or by a method of performing masking.

EXAMPLES

Hereinafter, the present invention will be described more specifically by way of Examples, but the present invention is not limited to these Examples.

Here, the evaluation method of each characteristic is as follows.

<Surface Roughness>

On the surface of the roughened nickel-plated sheet on which the roughened nickel layers were famed, a field of view of 97 μm×129 (length×width) (measurement field width of 129 μm, measurement area of about 12,500 μm² (12,500±100)) was scanned using a laser microscope (manufactured by Olympus Co., Ltd., model number: OLS3500) in accordance with JIS B0601:2013, and then the field of view was analyzed using analysis software (software name: LEXT-OLS) under the condition of analysis mode: roughness analysis, whereby the arithmetic mean roughness Ra and the ten-point mean roughness $Rz_{jis}$ were measured. Note that, the cut-off value at the time of measurement by a laser microscope was a wavelength of about 43 μm (43.2 on the display), which is a length of ⅓ of the measurement field width (129 μm).

<Nickel Content>

In the present example, the amount of nickel in the underlying nickel layer and the roughened nickel layer (nickel granules and nickel film) was determined by measurement using a fluorescent X-ray apparatus after the respective steps of forming the underlying nickel layer, nickel granules and nickel film. Specifically, the amount of nickel in the underlying nickel layer was once determined by using a fluorescent X-ray apparatus at the time of forming the underlying nickel layer. Thereafter, after the nickel granules were formed, the total amount of nickel was determined again by a fluorescent X-ray apparatus, and the difference between the obtained total amount of nickel and the amount of nickel in the underlying nickel layer was defined as the amount of nickel in the nickel granules. Further, after the nickel film was formed, the total amount of nickel was determined again by a fluorescent X-ray apparatus, and the difference between the total amount of nickel before the formation of the nickel film and the total amount of nickel after the formation of the nickel film was obtained, thereby determining the nickel amount of the nickel film in the same manner. Then, the amount of nickel in the total of the nickel granules and the nickel film was determined as the deposition amount of the roughened nickel layer.

Here, in the case where a metal containing nickel such as a stainless steel sheet or a nickel sheet is used as a base material, the amount of nickel in each layer cannot be measured by the above-mentioned X-ray fluorescence device. Therefore, using a base material containing no nickel such as a steel sheet in advance, at a plating condition where a underlying nickel layer having the predetermined amount of nickel is obtained, a metal sheet containing nickel such as stainless steel sheet and nickel sheet is electrolyzed so that it is possible to make it one having the same deposition amount.

Note that, although the measurement of the amount of nickel is performed by the above method in the present examples and the comparative examples, the measurement method of the amount of nickel is not limited to such a method, and the following method may be used. In the present example, the following methods were also adopted in part. That is, first, the roughened nickel-plated sheet where the underlying nickel layer, the nickel granules, and the nickel film are formed is measured by a fluorescent X-ray apparatus to determine the total amount of nickel in the layers formed in the roughened nickel-plated sheet. Then, by cutting the roughened nickel-plated sheet and observing the cross-section by a scanning electron microscope (SEM) so as to measure the thickness of the underlying nickel layer, the amount of nickel converted from the thickness of the underlying nickel layer determined, which is the amount of nickel in the underlying nickel layer. Then, by subtracting the amount of nickel of the underlying nickel layer from the total amount of nickel, the total amount of nickel of the nickel granules and the nickel film is obtained, and this can be used as the deposition amount of the roughened nickel layer. In particular, when the covering nickel plating is performed, in addition that the nickel film 122 forms the roughened nickel layer 12 by covering the nickel particulate 121, the nickel film 122 forms the underlying nickel layer in a part thereof. Therefore, according to such a method, the nickel amount of the underlying nickel layer in consideration of the growth (thickening) of the underlying nickel layer by the covering nickel plating can be obtained.

Here, when the cross-section was observed by a scanning electron microscope (SEM), the boundary between the metal base material and the underlying nickel layer, and the boundary between the underlying nickel layer and the roughened nickel layer were determined as shown in FIG. 15(A) and FIG. 15(B). That is, as shown in FIG. 15(A) and FIG. 15(B), for the boundary between the metal base material and the underlying nickel layer, since it can be clearly observed as shown in FIG. 15(A) and FIG. 15(B), the boundary between the metal base material and the underlying nickel layer was determined to be the position shown in FIG. 15(A) and FIG. 15(B) (broken line position below). For the boundary between the underlying nickel layer and the roughened nickel layer, as shown in FIG. 15(A) and FIG. 15(B), among the roots of the protrusion formed of the secondary particles, the boundary between the underlying nickel layer and the roughened nickel layer was determined to be the lowest position (broken line position above). Incidentally, FIG. 15(A) and FIG. 15(B) is a diagram for explaining the determination method of the boundary between the metal base material and the underlying nickel layer, and the boundary between the underlying nickel layer and the roughened nickel layer in Examples and Comparative Examples. FIG. 15(A) and FIG. 15(B) are those shown side by side the same scanning electron microscope (SEM) photograph, in FIG. 15(A) and FIG. 15(B), the respective boundary positions are indicated in FIG. 15(B) by using a broken line.

<Brightness L*>

The brightness L* of the surface of the roughened nickel layer was measured using a spectrophotometer (product name "CM-5", manufactured by Konica Minolta, inc.) in accordance with the geometric condition C in JIS Z8722 using the SCE-method (specular reflected light removing method).

<Glossiness of 85°>

The glossiness of 85° of the surface of the roughened nickel layer was measured using a gloss meter (product name "VG 7000", manufactured by Nippon Denshoku Industries Co., Ltd.) according to JIS 28741. When the glossiness of 60° was measured using the same measuring instrument, it was less than 1.5 in all Examples (Examples 1 to 32).

<Adhesion of Roughened Nickel Layer>

First, as a reference sample, an adhesive tape (product name "Cellotape (registered trademark)" manufactured by Nichiban Co., Ltd.) pasted on the backing paper was prepared, and the brightness L* and the chromaticity a*, b* were measured using a spectrophotometer (product name "CM-5", manufactured by Konica Minolta, inc.). In the measurement, CIE1976L*a*b* color-difference models were used.

Then, an adhesive tape (product name "Cellotape (registered trademark)" manufactured by Nichiban Co., Ltd.) was attached to the surface of the roughened nickel-plated sheet obtained in Examples and Comparative Examples on which the roughened nickel layer was famed so as to have a width of 24 mm and a length of 50 mm, and then a peeling test using the attached adhesive tape was performed in accordance with the peeling test methods described in JIS H8504. Then, the adhesive tape after the peeling test was attached on the same backing paper as the above reference sample, and the brightness L* and the chromaticity a*, b* were measured in the same manner as described above using a spectrophotometer. Then, from the measured results of the brightness L* and the chromaticity a*, b* of the reference sample which was measured in advance and the measured results of the brightness L* and the chromaticity a*, b* of the adhesive tape after the peeling test, these differences ΔE*ab (ΔE*ab= $[(\Delta L^*)^2+(\Delta a^*)^2+(\Delta b^*)^2]^{1/2}$) were calculated, and the adhesion of the roughened nickel layer was evaluated based on the following criteria. Note that, the smaller the ΔE*ab, the smaller the peeling amount in the peeling test, that is, the higher the residual rate of the roughened nickel layer after the peeling test, and the better the adhesion of the roughened nickel layer to the metal base material can be judged.

5 points: ΔE*ab is less than 1
4 points: ΔE*ab is 1 or more and less than 10
3 points: ΔE*ab is 10 or more and less than 30
2 points: ΔE*ab is 30 or more and less than 40
1 point: ΔE*ab is 40 or more <Adhesion (T Peel Strength) of Polypropylene Resin (PP Resin)>

The roughened nickel-plated sheets obtained in Examples and Comparative Examples were cut into two test master sheets each having a width of 15 mm and a length of 50 mm, which were used as T-peel test pieces. Then, for the two T-peel test pieces, respectively bent so that the bent angle becomes 90° at a position of length 20 mm. Then, surfaces having roughened nickel layer of each T-peel test piece were faced, and a polypropylene resin film having a width of 15 mm, a length of 15 mm, and a thickness of 60 μm (product name "Modic", polypropylene resin bilayer film manufactured by Mitsubishi Chemical Corporation, a bonding surface used for evaluation is bonding surfaces between a polypropylene resin and a T-peel test piece, and product name "Modic" is an adhesive layer for stabilizing a test) was sandwiched therebetween, and heat sealing was performed under the conditions of temperature: 190° C., pressing time: 5 seconds, and heat sealing pressure: 2.0 kgf/cm$^2$, and two T-peel test pieces were bonded via a polypropylene resin film. The position where the polypropylene resin film is sandwiched is an end portion in the length direction of a T-peel test body, and the entire polypropylene resin film becomes a bonding surface. The T-peel test body thus prepared is subjected to tensile test using a tensile tester (universal material testing instrument Tensilon RTC-1350A manufactured by ORIENTEC CORPORATION), and is subjected to measure the peel load (T-peel strength). Measurement conditions were tensile speed of 10 mm/min. at room temperature. It can be judged that the higher the T-peel strength, the better the adhesion to the resin.

Example 1

As a substrate, a steel sheet obtained by annealing a cold rolled sheet of low carbon aluminum killed steel (thickness 0.25 mm) is prepared.

Then, the prepared steel sheet was subjected to alkali electrolytic degreasing and pickling by sulfuric acid immersion, followed by electrolytic plating under the following conditions using underlying nickel plating bath having the following bath composition to form underlying nickel layers on both surfaces of the steel sheet.

<Underlying Nickel Plating Conditions>

Bath composition: 250 g/L of nickel sulfate hexahydrate, 45 g/L of nickel chloride hexahydrate, and 30 g/L of boric acid
pH: 4.2
Bath temperature: 60° C.
Current density: 10 A/dm$^2$
Plating time: 30 seconds Next, the steel sheet on which the underlying nickel layer was formed was subjected to electrolytic plating (roughened nickel plating) under the following conditions using a roughened nickel plating bath having the following bath composition, whereby nickel granules were precipitated on the underlying nickel layer on both sides of the steel sheet.

<Roughened Nickel Plating Conditions>
Bath composition: 20 g/L of nickel sulfate hexahydrate and 20 g/L of ammonium sulfate
pH: 6.2
Bath temperature: 30° C.
Current density: 20 A/dm$^2$
Plating time: 11 seconds Next, the steel sheet on which nickel granules were precipitated on the underlying nickel layer was subjected to electrolytic plating (covering nickel plating) under the following conditions by using a covering nickel plating bath having the following bath composition to cover the nickel granules precipitated on the underlying nickel layer with a nickel file, whereby a roughened nickel-plated sheet of Example 1 was obtained.
<Covering Nickel Plating Conditions>
Bath composition: 250 g/L of nickel sulfate hexahydrate, 45 g/L of nickel chloride hexahydrate, and 30 g/L of boric acid
pH: 4.2
Bath temperature: 60° C.
Current density: 10 A/dm$^2$
Plating time: 30 seconds The obtained roughened nickel-plated sheet was subjected to measurements and evaluations of the amounts of nickel in the underlying nickel layer, nickel granules and nickel file, the brightness L* and glossiness of 85° of the roughened nickel layer surfaces, the adhesion of the roughened nickel layer, and the adhesion of the polypropylene resin (PP resin). The results are shown in Table 1.

Examples 2 to 15

The roughened nickel-plated sheets of Examples 2 to 15 were obtained and evaluated in the same manner as in Example 1, except that the plating bath and plating conditions of roughened nickel plating were changed to the conditions shown in Table 1, and the processing time of the covering nickel plating was changed so that the deposition amount of the nickel film to be formed became the amount shown in Table 1. The results are shown in Table 1.

Examples 16 to 31

The roughened nickel-plated sheets of Examples 16 to 31 were obtained and evaluated in the same manner as in Example 1, except that the plating conditions of roughened nickel plating were changed to the conditions shown in Table 2, and the processing time of the covering nickel plating was changed so that the deposition amount of the nickel film to be formed became the amount shown in Table 2. The results are shown in Table 2.

Example 32

The roughened nickel-plated sheet of Example 32 was obtained and evaluated in the same manner as in Example 1, except that a copper sheet (electrolytic copper foil manufactured by Fukuda Metal Foil & Powder Co., Ltd. (Ra: 0.1 μm, Rz$_{jis}$: 1.7 μm as measured values by laser microscopy) was used as the metal base material, the conditions of roughened nickel plating were changed to the conditions shown in Table 2, and the processing time of covering nickel plating was changed so that the deposition amount of the nickel film to be famed became the amount shown in Table 2. The results are shown in Table 2.

Examples 33 to 36

The roughened nickel-plated sheets of Examples 33 to 36 were obtained and evaluated in the same manner as in Example 1, except that the roughened nickel plating conditions were changed to the conditions shown in Table 2, and the processing time of the covering nickel plating was changed so that the deposition amount of the nickel film to be famed became the amount shown in Table 2. The results are shown in Table 2.

Examples 37 to 41

The roughened nickel-plated sheets of Examples 37 to 41 were obtained and evaluated in the same manner as in Example 1, except that SUS304 (Example 37), SUS316 (Example 38), SUS430 (Example 39), SUS444 (Example 40), and pure nickel sheet (Example 41) were used as the metal base materials, respectively, and the roughened nickel plating conditions were changed to the conditions shown in Table 2, and the processing time of the covering nickel plating was changed so that the deposition amount of the nickel film to be famed became the amount shown in Table 2. The results are shown in Table 2. Note that, in Examples 37 to 41, SUS304, SUS316, SUS430, SUS444 and pure nickel sheet were used, and after pickling in the sulfuric acid immersion, the underlying nickel layers were formed after electrolysis (strike nickel plating) under the following conditions by using a strike nickel plating bath having the following bath compositions.
<Strike Nickel Plating Conditions>
Bath composition: 250 g/L of Nickel sulfate hexahydrate, 50 g/L of sulfuric acid 50 g/L
pH: 1.0 or less
Bath temperature: 60° C.
Current density: 30 A/dm$^2$
Plating time: 5 seconds Comparative Examples 1 to 10

The roughened nickel-plated sheets of Comparative Examples 1 to 10 were obtained and evaluated in the same manner as in Example 1, except that the conditions of roughened nickel plating and covering nickel plating were changed to the conditions shown in Table 3. The results are shown in Table 3.

Comparative Examples 11 to 22

The roughened nickel-plated sheets of Comparative Examples 11 to 22 were obtained and evaluated in the same manner as in Example 1, except that the roughened nickel plating conditions were changed to the conditions shown in Table 3 and the covering nickel plating was not performed. The results are shown in Table 3.

Comparative Examples 23, 24

The roughened nickel-plated sheets of Comparative Examples 23 and 24 were obtained and evaluated in the same manner as in Example 1, except that a copper sheet was used as the metal base material, the roughened nickel plating conditions were changed to the conditions shown in Table 4, and the covering nickel plating was not performed. The results are shown in Table 4. In Comparative Example 23, an electrolytic copper foil manufactured by Fukuda Metal Foil & Powder Co., Ltd. (Ra: 0.1 μm, Rz$_{jis}$: 1.7 μm as measured values by laser microscopy) was used as a copper sheet, and in Comparative Example 24, a copper foil whose surfaces were roughened by performing roughening copper plating on the same copper foil as in Comparative Example 23 was used as a copper sheet.

Comparative Examples 25 to 32

The roughened nickel-plated sheets of Comparative Examples 25 to 32 were obtained and evaluated in the same manner as in Example 1, except that the roughened nickel plating conditions were changed to the conditions shown in Table 4 and the covering nickel plating was not performed. The results are shown in Table 4.

Comparative Example 33

The roughened nickel-plated sheets of Comparative Example 33 was obtained and evaluated in the same manner as in Example 1, except that neither roughened nickel plating nor covering nickel plating was performed. The results are shown in Table 4.

Comparative Examples 34 to 36

The roughened nickel-plated sheets of Comparative Examples 34 to 36 were obtained and evaluated in the same manner as in Example 1, except that the roughened nickel plating conditions were changed to the conditions shown in Table 4 and the covering nickel plating was not performed. The results are shown in Table 4.

Comparative Examples 37 to 39

The roughened nickel-plated sheets of Comparative Examples 37 to 39 were obtained and evaluated in the same manner as in Example 1, except that the conditions of roughened nickel plating and covering nickel plating were changed to the conditions shown in Table 4. The results are shown in Table 4.

[Table 1]

TABLE 1

| | | Roughened nickel plating bath [g/L] | | | | | | | Roughened nickel plating condition | | | |
| --- | --- | --- | --- | --- | --- | --- | --- | --- | --- | --- | --- | --- |
| | Metal base material | Nickel sulfate hexahydrate | Nickel chloride hexahydrate | Ammonium sulfate | Ammonium chloride | Boric acid | Sodium chloride | Ammonia 28% aqueous solution | Bath temperature [°C.] | pH | Current density [A/dm$^2$] | Plating time [sec] |
| Example 1 | Steel sheet | 10 | — | 20 | — | — | — | — | 30 | 6.2 | 20 | 14 |
| Example 2 | Steel sheet | 20 | — | 20 | — | — | — | — | 30 | 6.2 | 20 | 14 |
| Example 3 | Steel sheet | 20 | — | 20 | — | — | — | — | 30 | 6.2 | 15 | 24 |
| Example 4 | Steel sheet | 20 | — | 20 | — | — | — | — | 30 | 6.2 | 15 | 16 |
| Example 5 | Steel sheet | 20 | — | 20 | — | — | — | — | 30 | 6.2 | 15 | 16 |
| Example 6 | Steel sheet | 20 | — | 20 | — | — | — | — | 30 | 6.2 | 15 | 32 |
| Example 7 | Steel sheet | 20 | — | 20 | — | — | — | — | 30 | 6.2 | 15 | 32 |
| Example 8 | Steel sheet | 20 | — | 20 | — | — | — | — | 30 | 6.2 | 15 | 32 |
| Example 9 | Steel sheet | 20 | — | 20 | — | — | — | — | 30 | 6.2 | 10 | 20 |
| Example 10 | Steel sheet | 20 | — | 20 | — | — | — | — | 30 | 6.2 | 10 | 40 |
| Example 11 | Steel sheet | 20 | — | 20 | — | — | — | — | 30 | 6.2 | 10 | 40 |
| Example 12 | Steel sheet | 20 | — | 20 | — | — | — | — | 30 | 6.2 | 20 | 14 |
| Example 13 | Steel sheet | 20 | — | 20 | — | — | — | — | 30 | 6.2 | 20 | 14 |
| Example 14 | Steel sheet | 20 | — | 20 | — | — | — | — | 30 | 6.2 | 20 | 27 |
| Example 15 | Steel sheet | 20 | — | 20 | — | — | — | — | 30 | 6.2 | 20 | 27 |

TABLE 1-continued

| | Deposition amount of nickel (g/cm²) | | | Roughened | | | Evaluation | | Thickness of underlying Ni (μm) Actually measured thickness (measured by cross-section SEM image) | Amount of underlying Ni (g/m²) Actually measured thickness (conversion of specific gravity) | Growth amount of underlying nickel (deposition amount) [g/m²] (conversion of specific gravity) |
|---|---|---|---|---|---|---|---|---|---|---|---|
| | Underlying nickel layer | Nickel granules | Nickel film | Roughened nickel layer | Surface roughness | | nickel layer | Adhesion of resin [N/15 mm] | Adhesion of roughened nickel layer | | | |
| | | | | | Ra [μm] | Rzjis [μm] | Brightness L* | Glossiness of 85° | | | | | |
| Example 1 | 8.90 | 1.78 | 8.90 | 10.68 | 0.5 | 6.1 | 39.2 | 16.5 | 6.7 | 5 | 1.3 | 11.6 | 2.7 |
| Example 2 | 8.90 | 1.78 | 8.90 | 10.68 | 0.5 | 4.8 | 39.8 | 23.7 | 5.7 | 5 | 1.3 | 11.6 | 2.7 |
| Example 3 | 8.90 | 2.67 | 10.68 | 13.35 | 0.5 | 6.2 | 38.8 | 8.6 | 33.3 | 5 | 1.3 | 11.6 | 2.7 |
| Example 4 | 8.90 | 1.78 | 4.45 | 6.23 | 0.2 | 3.4 | 38.2 | 27.1 | 8.7 | 4 | 1.2 | 10.7 | 1.8 |
| Example 5 | 8.90 | 1.78 | 6.68 | 8.46 | 0.3 | 4.2 | 42.8 | 28.4 | 9.7 | 5 | 1.3 | 11.6 | 2.7 |
| Example 6 | 8.90 | 3.56 | 8.90 | 12.46 | 0.8 | 9.4 | 33.7 | 4.0 | 45.3 | 3 | 1.3 | 11.6 | 2.7 |
| Example 7 | 8.90 | 3.56 | 17.80 | 21.36 | 0.8 | 9.6 | 43.1 | 5.7 | 26.7 | 5 | 1.4 | 12.5 | 3.6 |
| Example 8 | 8.90 | 3.56 | 26.70 | 30.26 | 0.7 | 10.3 | 47.6 | 5.4 | 21.0 | 5 | 1.5 | 13.4 | 4.5 |
| Example 9 | 8.90 | 1.78 | 6.68 | 8.46 | 0.2 | 3.2 | 44.6 | 30.3 | 9.3 | 5 | 1.3 | 11.6 | 2.7 |
| Example 10 | 8.90 | 3.56 | 8.90 | 12.46 | 0.9 | 9.3 | 35.9 | 3.6 | 38.7 | 3 | 1.3 | 11.6 | 2.7 |
| Example 11 | 8.90 | 3.56 | 17.80 | 21.36 | 0.9 | 9.5 | 42.4 | 3.4 | 30.7 | 4 | 1.4 | 12.5 | 3.6 |
| Example 12 | 8.90 | 1.78 | 6.68 | 8.46 | 0.4 | 5.6 | 39.2 | 19.3 | 12.3 | 4 | 1.3 | 11.6 | 2.7 |
| Example 13 | 8.90 | 1.78 | 8.90 | 10.68 | 0.3 | 5.2 | 43.2 | 22.4 | 9.0 | 5 | 1.3 | 11.6 | 2.7 |
| Example 14 | 8.90 | 3.56 | 8.90 | 12.46 | 0.8 | 7.7 | 32.5 | 3.3 | 41.7 | 3 | 1.3 | 11.6 | 2.7 |
| Example 15 | 8.90 | 3.56 | 17.80 | 21.36 | 0.8 | 9.0 | 39.2 | 3.1 | 38.3 | 4 | 1.4 | 12.5 | 3.6 |

TABLE 2

| | Metal base material | Roughened nickel plating bath [g/L] | | | | | | | Roughened nickel plating condition | | | |
|---|---|---|---|---|---|---|---|---|---|---|---|---|
| | | Nickel sulfate hexahydrate | Nickel chloride hexahydrate | Ammonium sulfate | Ammonium chloride | Boric acid | Sodium chloride | Ammonia 28% aqueous solution | Bath temperature [° C.] | pH | Current density [A/dm²] | Plating time [sec] |
| Example 16 | Steel sheet | 10 | — | 20 | — | — | — | — | 30 | 6.2 | 15 | 16 |
| Example 17 | Steel sheet | 20 | — | 20 | — | — | — | — | 30 | 6.2 | 15 | 32 |
| Example 18 | Steel sheet | 20 | — | 20 | — | — | — | — | 30 | 6.2 | 15 | 32 |
| Example 19 | Steel sheet | 20 | — | 20 | — | — | — | — | 40 | 6.2 | 5 | 53 |
| Example 20 | Steel sheet | 20 | — | 20 | — | — | — | — | 50 | 6.2 | 5 | 49 |
| Example 21 | Steel sheet | 20 | — | 20 | — | — | — | — | 30 | 6.2 | 10 | 38 |
| Example 22 | Steel sheet | 20 | — | 20 | — | — | — | — | 30 | 6.2 | 5 | 60 |
| Example 23 | Steel sheet | 20 | — | 20 | — | — | — | — | 30 | 6.2 | 15 | 20 |
| Example 24 | Steel sheet | 20 | — | 20 | — | — | — | — | 30 | 6.2 | 15 | 24 |
| Example 25 | Steel sheet | 20 | — | 20 | — | — | — | — | 30 | 6.2 | 15 | 28 |

TABLE 2-continued

| | | Deposition amount of nickel (g/cm²) | | | | | | | |
|---|---|---|---|---|---|---|---|---|---|
| | | | | | | | | | |
| Example 26 | Steel sheet | 20 | — | 20 | — | — | — | — | 30 | 6.2 | 15 | 32 |
| Example 27 | Steel sheet | 20 | — | 20 | — | — | — | — | 30 | 6.2 | 15 | 16 |
| Example 28 | Steel sheet | 20 | — | 20 | — | — | — | — | 30 | 6.2 | 15 | 32 |
| Example 29 | Steel sheet | 20 | — | 20 | — | — | — | — | 30 | 6.2 | 15 | 24 |
| Example 30 | Steel sheet | 20 | — | 20 | — | — | — | — | 30 | 6.2 | 15 | 24 |
| Example 31 | Steel sheet | 20 | — | 20 | — | — | — | — | 35 | 6.2 | 15 | 30 |
| Example 32 | Steel sheet | 20 | — | 20 | — | — | — | — | 35 | 6.2 | 15 | 30 |
| Example 33 | Steel sheet | 20 | 1 | 20 | — | — | — | — | 30 | 6 | 15 | 30 |
| Example 34 | Steel sheet | 20 | 20 | 20 | — | — | — | — | 30 | 6 | 15 | 26 |
| Example 35 | Steel sheet | 20 | 0 | 20 | 3 | — | — | — | 30 | 6 | 15 | 30 |
| Example 36 | Steel sheet | — | 18 | 0 | 16 | — | 20 | — | 30 | 6 | 15 | 24 |
| Example 37 | SUS 304 | 20 | — | 20 | — | — | — | — | 35 | 6.2 | 15 | 30 |
| Example 38 | SUS 316 | 20 | — | 20 | — | — | — | — | 35 | 6.2 | 15 | 30 |
| Example 39 | SUS 430 | 20 | — | 20 | — | — | — | — | 35 | 6.2 | 15 | 30 |
| Example 40 | SUS 444 | 20 | — | 20 | — | — | — | — | 35 | 6.2 | 15 | 30 |
| Example 41 | Pure Ni sheet | 20 | — | 20 | — | — | — | — | 35 | 6.2 | 15 | 30 |

| | Deposition amount of nickel (g/cm²) | | | Roughened nickel layer | | | | Evaluation | | Thickness of underlying Ni (μm) Actually measured thickness (measured by cross-section SEM image) | Amount of underlying Ni (g/m²) Actually measured thickness (conversion of specific gravity) | Growth amount of underlying nickel (deposition amount) [g/m²] (conversion of specific gravity) |
|---|---|---|---|---|---|---|---|---|---|---|---|---|
| | Underlying nickel layer | Nickel granules | Nickel film | Roughened nickel layer | Surface roughness | | Brightness L* | Glossiness of 85° | Adhesion of resin [N/15 mm] | Adhesion of roughened nickel layer | | | |
| | | | | | Ra [μm] | Rzjis [μm] | | | | | | | |
| Example 16 | 8.90 | 1.78 | 6.68 | 8.46 | 0.2 | 3.8 | 42.9 | 26.5 | 5.3 | 5 | 1.3 | 11.6 | 2.7 |
| Example 17 | 8.90 | 3.56 | 8.90 | 12.46 | 0.9 | 10.0 | 34.3 | 4.2 | 35.3 | 3 | 1.2 | 10.7 | 1.8 |
| Example 18 | 8.90 | 3.56 | 17.80 | 21.36 | 0.7 | 8.6 | 42.1 | 5.0 | 35.7 | 5 | 1.4 | 12.5 | 3.6 |
| Example 19 | 8.90 | 3.56 | 8.90 | 12.46 | 0.4 | 6.2 | 44.4 | 14.8 | 20.0 | 5 | 1.3 | 11.6 | 2.7 |
| Example 20 | 8.90 | 3.56 | 8.90 | 12.46 | 0.5 | 6.2 | 43.3 | 15.0 | 10.0 | 5 | 1.3 | 11.6 | 2.7 |
| Example 21 | 8.90 | 3.56 | 8.90 | 12.46 | 0.8 | 7.9 | 36.6 | 5.9 | 52.0 | 4 | 1.3 | 11.6 | 2.7 |
| Example 22 | 8.90 | 3.56 | 8.90 | 12.46 | 0.8 | 7.9 | 40.7 | 6.9 | 47.0 | 4 | 1.3 | 11.6 | 2.7 |
| Example 23 | 8.90 | 2.23 | 8.90 | 11.13 | 0.4 | 5.9 | 41.0 | 25.0 | 10.0 | 5 | 1.3 | 11.6 | 2.7 |
| Example 24 | 8.90 | 2.67 | 8.90 | 11.57 | 0.5 | 7.1 | 40.0 | 16.0 | 24.0 | 4 | 1.3 | 11.6 | 2.7 |
| Example 25 | 8.90 | 3.12 | 8.90 | 12.02 | 0.8 | 9.2 | 38.0 | 7.9 | 47.0 | 4 | 1.2 | 10.7 | 1.8 |
| Example 26 | 8.90 | 3.56 | 8.90 | 12.46 | 1.2 | 10.0 | 32.2 | 4.2 | 42.0 | 3 | 1.3 | 11.6 | 2.7 |
| Example 27 | 8.90 | 1.78 | 7.12 | 8.90 | 0.3 | 4.6 | 46.5 | 47.8 | 5.0 | 5 | 1.3 | 11.6 | 2.7 |
| Example 28 | 8.90 | 3.56 | 13.35 | 16.91 | 1.4 | 12.3 | 38.2 | 10.2 | 52.0 | 4 | 1.2 | 10.7 | 1.8 |
| Example 29 | 8.90 | 2.67 | 13.35 | 16.02 | 1.0 | 9.6 | 38.01 | 3.3 | 38 | 4 | 1.3 | 11.6 | 2.7 |
| Example 30 | 8.90 | 2.67 | 17.80 | 20.47 | 1.1 | 9.6 | 41.38 | 3.1 | 34 | 5 | 1.4 | 12.5 | 3.6 |

TABLE 2-continued

| | | | | | | | | | | | | | |
|---|---|---|---|---|---|---|---|---|---|---|---|---|---|
| Example 31 | 8.90 | 3.56 | 10.68 | 14.24 | 1.3 | 15.4 | 30.2 | 1.6 | 49 | 4 | 1.2 | 10.7 | 1.8 |
| Example 32 | 8.90 | 3.56 | 10.68 | 14.24 | 1.2 | 14.8 | 33.1 | 1.9 | 47 | 4 | 1.3 | 11.6 | 2.7 |
| Example 33 | 8.90 | 3.56 | 10.68 | 14.24 | 0.7 | 6.3 | 43.2 | 7.1 | 30 | 5 | 1.3 | 11.6 | 2.7 |
| Example 34 | 8.90 | 3.56 | 10.68 | 14.24 | 0.7 | 6.7 | 45.3 | 10.0 | 19 | 4 | 1.3 | 11.6 | 2.7 |
| Example 35 | 8.90 | 3.56 | 10.68 | 14.24 | 0.6 | 6.0 | 46.1 | 12.4 | 10 | 5 | 1.4 | 12.5 | 3.6 |
| Example 36 | 8.90 | 3.56 | 10.68 | 14.24 | 0.8 | 7.8 | 43.1 | 6.8 | 10 | 5 | 1.4 | 12.5 | 3.6 |
| Example 37 | 8.90 | 3.56 | 10.68 | 14.24 | 1.2 | 11.5 | 36.1 | 1.9 | 42 | 4 | 1.3 | 11.6 | 2.7 |
| Example 38 | 8.90 | 3.56 | 10.68 | 14.24 | 1.2 | 12.1 | 36.4 | 1.8 | 39 | 4 | 1.3 | 11.6 | 2.7 |
| Example 39 | 8.90 | 3.56 | 10.68 | 14.24 | 1.3 | 12.8 | 35.9 | 1.6 | 46 | 4 | 1.3 | 11.6 | 2.7 |
| Example 40 | 8.90 | 3.56 | 10.68 | 14.24 | 1.2 | 12.3 | 36.1 | 1.7 | 38 | 4 | 1.3 | 11.6 | 2.7 |
| Example 41 | 8.90 | 3.56 | 10.68 | 14.24 | 1.1 | 10.9 | 38.1 | 1.9 | 37 | 5 | 1.2 | 10.7 | 1.8 |

TABLE 3

| | Metal base material | Roughened nickel plating bath [g/L] | | | | | | | Roughened nickel plating condition | | | |
|---|---|---|---|---|---|---|---|---|---|---|---|---|
| | | Nickel sulfate hexahydrate | Nickel chloride hexahydrate | Ammonium sulfate | Ammonium chloride | Boric acid | Sodium chloride | Ammonia 28% aqueous solution | Bath temperature [° C.] | pH | Current density [A/dm$^2$] | Plating time [sec] |
| Comparative Example 1 | Steel sheet | 30 | — | 20 | — | — | — | — | 30 | 6.2 | 10 | 19 |
| Comparative Example 2 | Steel sheet | 30 | — | 20 | — | — | — | — | 30 | 6.2 | 15 | 16 |
| Comparative Example 3 | Steel sheet | 40 | — | 20 | — | — | — | — | 30 | 6.2 | 20 | 14 |
| Comparative Example 4 | Steel sheet | 20 | — | 20 | — | — | — | — | 30 | 6.2 | 15 | 8 |
| Comparative Example 5 | Steel sheet | 20 | — | 20 | — | — | — | — | 30 | 6.2 | 15 | 32 |
| Comparative Example 6 | Steel sheet | 20 | — | 20 | — | — | — | — | 30 | 6 | 15 | 48 |
| Comparative Example 7 | Steel sheet | 20 | — | 20 | — | — | — | — | 30 | 6 | 15 | 80 |
| Comparative Example 8 | Steel sheet | 30 | — | 20 | — | 20 | 50 | 20 | 50 | 5 | 10 | 113 |
| Comparative Example 9 | Steel sheet | 30 | — | 20 | — | 20 | 50 | 20 | 50 | 5 | 10 | 225 |
| Comparative Example 10 | Steel sheet | 20 | — | 20 | — | — | — | — | 30 | 6.2 | 15 | 24 |
| Comparative Example 11 | Steel sheet | 10 | — | 20 | — | — | — | — | 30 | 6.2 | 10 | 20 |
| Comparative Example 12 | Steel sheet | 10 | — | 20 | — | — | — | — | 30 | 6.2 | 15 | 16 |
| Comparative Example 13 | Steel sheet | 10 | — | 20 | — | — | — | — | 30 | 6.2 | 20 | 14 |
| Comparative Example 14 | Steel sheet | 20 | — | 20 | — | — | — | — | 30 | 6.2 | 10 | 20 |
| Comparative Example 15 | Steel sheet | 20 | — | 20 | — | — | — | — | 30 | 6.2 | 15 | 16 |
| Comparative Example 16 | Steel sheet | 20 | — | 20 | — | — | — | — | 30 | 6.2 | 20 | 14 |
| Comparative Example 17 | Steel sheet | 30 | — | 20 | — | — | — | — | 30 | 6.2 | 10 | 20 |
| Comparative Example 18 | Steel sheet | 30 | — | 20 | — | — | — | — | 30 | 6.2 | 15 | 16 |
| Comparative Example 19 | Steel sheet | 30 | — | 20 | — | — | — | — | 30 | 6.2 | 20 | 14 |
| Comparative Example 20 | Steel sheet | 40 | — | 20 | — | — | — | — | 30 | 6.2 | 20 | 14 |

TABLE 3-continued

| | Metal base material | Nickel sulfate hexahydrate | Nickel chloride hexahydrate | Ammonium sulfate | Ammonium chloride | Boric acid | Sodium chloride | Ammonia 28% aqueous solution | Bath temperature [° C.] | pH | Current density [A/dm²] | Plating time [sec] |
|---|---|---|---|---|---|---|---|---|---|---|---|---|
| Comparative Example 21 | Steel sheet | 20 | — | 20 | — | — | — | — | 30 | 6.2 | 15 | 32 |
| Comparative Example 22 | Steel sheet | 70 | — | 30 | — | — | — | — | 30 | 6.2 | 35 | 21 |

| | Deposition amount of nickel (g/cm²) | | | | Surface roughness | | Roughened nickel layer | | Evaluation | |
|---|---|---|---|---|---|---|---|---|---|---|
| | Underlying nickel layer | Nickel granules | Nickel film | Roughened nickel layer | Ra [µm] | Rzjis [µm] | Brightness L* | Glossiness of 85° | Adhesion of resin [N/15 mm] | Adhesion of roughened nickel layer |
| Comparative Example 1 | 8.90 | 1.78 | 8.90 | 10.68 | 0.2 | 2.6 | 59.3 | 64.5 | 0.0 | 5 |
| Comparative Example 2 | 8.90 | 1.78 | 8.90 | 10.68 | 0.3 | 4.1 | 53.1 | 50.4 | 0.0 | 5 |
| Comparative Example 3 | 8.90 | 1.78 | 8.90 | 10.68 | 0.2 | 3.2 | 52.3 | 50.7 | 0.0 | 5 |
| Comparative Example 4 | 8.90 | 0.89 | 13.35 | 14.24 | 0.2 | 3.3 | 74.4 | 84.0 | 0.0 | 5 |
| Comparative Example 5 | 8.90 | 3.56 | 7.12 | 10.68 | 1.3 | 11.1 | 29.0 | 7.3 | 48.0 | 2 |
| Comparative Example 6 | 8.90 | 5.34 | 8.90 | 14.24 | 2.8 | 22.7 | 28.4 | 1.2 | 50 | 1 |
| Comparative Example 7 | 8.90 | 8.90 | 8.90 | 17.80 | 3.9 | 34.0 | 23.7 | 0.5 | 52 | 1 |
| Comparative Example 8 | 8.90 | 13.35 | 17.80 | 31.15 | 1.9 | 19.4 | 41.6 | 0.4 | Not measured | 2 |
| Comparative Example 9 | 8.90 | 26.70 | 17.80 | 44.50 | 6.4 | 45.8 | 27.3 | 0.3 | Not measured | 2 |
| Comparative Example 10 | 8.90 | 2.67 | 35.60 | 38.27 | 0.8846 | 9.194 | 52.2 | 3.2 | 2.6 | 5 |
| Comparative Example 11 | 8.90 | 1.78 | Not formed | 1.78 | 0.3 | 4.2 | 21.3 | 22.7 | 5.7 | 1 |
| Comparative Example 12 | 8.90 | 1.78 | Not formed | 1.78 | 0.3 | 4.0 | 19.1 | 18.8 | 3.7 | 1 |
| Comparative Example 13 | 8.90 | 1.78 | Not formed | 1.78 | 0.5 | 4.5 | 17.5 | 15.0 | 2.0 | 1 |
| Comparative Example 14 | 8.90 | 1.78 | Not formed | 1.78 | 0.3 | 3.9 | 22.11 | 32.4 | 4.3 | 1 |
| Comparative Example 15 | 8.90 | 1.78 | Not formed | 1.78 | 0.3 | 3.8 | 19.21 | 24.6 | 4.3 | 1 |
| Comparative Example 16 | 8.90 | 1.78 | Not formed | 1.78 | 0.4 | 4.3 | 17.59 | 20.8 | 4.0 | 1 |
| Comparative Example 17 | 8.90 | 1.78 | Not formed | 1.78 | 0.2 | 3.8 | 24.86 | 53.2 | 3.0 | 1 |
| Comparative Example 18 | 8.90 | 1.78 | Not formed | 1.78 | 0.2 | 3.0 | 21.39 | 42.8 | 7.7 | 1 |
| Comparative Example 19 | 8.90 | 1.78 | Not formed | 1.78 | 0.3 | 4.5 | 19.32 | 37.3 | 6.3 | 1 |
| Comparative Example 20 | 8.90 | 1.78 | Not formed | 1.78 | 0.2 | 2.9 | 21.88 | 44.5 | 8.3 | 1 |
| Comparative Example 21 | 8.90 | 3.56 | Not formed | 3.56 | 2.1 | 14.0 | 19.2 | 1.7 | 27.0 | 1 |
| Comparative Example 22 | 8.90 | 4.45 | Not formed | 4.45 | 0.51 | 6.29 | 28.39 | 15.4 | Not measured | 1 |

TABLE 4

| | | Roughened nickel plating bath [g/L] | | | | | | | Roughened nickel plating condition | | | |
|---|---|---|---|---|---|---|---|---|---|---|---|---|
| | Metal base material | Nickel sulfate hexahydrate | Nickel chloride hexahydrate | Ammonium sulfate | Ammonium chloride | Boric acid | Sodium chloride | Ammonia 28% aqueous solution | Bath temperature [° C.] | pH | Current density [A/dm²] | Plating time [sec] |
| Comparative Example 23 | Steel sheet | 70 | — | 30 | — | — | — | — | 30 | 6.2 | 35 | 21 |
| Comparative Example 24 | Steel sheet | 70 | — | 30 | — | — | — | — | 30 | 6.2 | 35 | 21 |
| Comparative Example 25 | Steel sheet | 20 | — | 20 | — | — | — | — | 50 | 6.2 | 5 | 49 |
| Comparative Example 26 | Steel sheet | 20 | — | 20 | — | — | — | — | 50 | 6.2 | 10 | 30 |

TABLE 4-continued

| | | | | | | | | | | | | |
|---|---|---|---|---|---|---|---|---|---|---|---|---|
| Comparative Example 27 | Steel sheet | 20 | — | 20 | — | — | — | — | 30 | 6.2 | 15 | 32 |
| Comparative Example 28 | Steel sheet | 20 | — | 20 | — | — | — | — | 30 | 6.2 | 5 | 60 |
| Comparative Example 29 | Steel sheet | 20 | — | 20 | — | — | — | — | 30 | 6 | 10 | 38 |
| Comparative Example 30 | Steel sheet | 30 | — | 20 | — | 20 | 50 | 20 | 50 | 5 | 10 | 113 |
| Comparative Example 31 | Steel sheet | 30 | — | 20 | — | 20 | 50 | 20 | 50 | 5 | 10 | 225 |
| Comparative Example 32 | Steel sheet | 20 | — | 20 | — | — | — | — | 50 | 5 | 8 | 131 |
| Comparative Example 33 | Steel sheet | Roughened nickel plating is not performed | | | | | | | Roughened nickel plating is not performed | | | |
| Comparative Example 34 | Steel sheet | 20 | — | 20 | — | — | — | — | 30 | 6.2 | 15 | 8 |
| Comparative Example 35 | Steel sheet | 20 | — | 20 | — | — | — | — | 30 | 6.2 | 15 | 16 |
| Comparative Example 36 | Steel sheet | 20 | — | 20 | — | — | — | — | 30 | 6.2 | 15 | 24 |
| Comparative Example 37 | Steel sheet | 20 | 50 | 20 | 0 | — | — | — | 30 | 6 | 15 | 26 |
| Comparative Example 38 | Steel sheet | 20 | 0 | 20 | 10 | — | — | — | 30 | 6 | 15 | 24 |
| Comparative Example 39 | Steel sheet | 20 | 0 | 20 | 20 | — | — | — | 30 | 6 | 15 | 24 |

| | Deposition amount of nickel (g/cm$^2$) | | | | Surface roughness | | Roughened nickel layer | | Evaluation | |
|---|---|---|---|---|---|---|---|---|---|---|
| | Underlying nickel layer | Nickel granules | Nickel film | Roughened nickel layer | Ra [μm] | Rzjis [μm] | Brightness L* | Glossiness of 85° | Adhesion of resin [N/15 mm] | Adhesion of roughened nickel layer |
| Comparative Example 23 | 8.90 | 4.45 | Not formed | 4.45 | 0.65 | 7.52 | 27.4 | 17.1 | Not measured | 1 |
| Comparative Example 24 | 8.90 | 4.45 | Not formed | 4.45 | 1.66 | 18.6 | 38.01 | 0.3 | Not measured | 1 |
| Comparative Example 25 | 8.90 | 3.56 | Not formed | 3.56 | 0.5 | 5.4 | 24.13 | 21.2 | 48.0 | 1 |
| Comparative Example 26 | 8.9 | 3.56 | Not formed | 3.56 | 0.9 | 7.1 | 19.6 | 6.5 | 43.0 | 1 |
| Comparative Example 27 | 8.9 | 3.56 | Not formed | 3.56 | 0.7 | 7.3 | 22.9 | 12.7 | 46.0 | 1 |
| Comparative Example 28 | 8.9 | 3.56 | Not formed | 3.56 | 0.7 | 7.5 | 22.65 | 9.6 | 55.0 | 1 |
| Comparative Example 29 | 8.9 | 3.56 | Not formed | 3.56 | 1.7 | 11.9 | 19.17 | 1.7 | Not measured | 1 |
| Comparative Example 30 | 8.9 | 13.35 | Not formed | 13.35 | 2.8 | 24.7 | 29.95 | 0.3 | Not measured | 1 |
| Comparative Example 31 | 8.9 | 26.7 | Not formed | 26.70 | 8.6 | 55.7 | 28.46 | 0.2 | Not measured | 1 |
| Comparative Example 32 | 8.9 | 13.35 | Not formed | 13.35 | 6.4 | 45.8 | 29.81 | 0.4 | Not measured | 1 |
| Comparative Example 33 | 8.9 | Not formed | Not formed | — | 0.3 | 2.2 | 61 | 71.9 | 0 | 5 |
| Comparative Example 34 | 8.9 | 0.89 | Not formed | 0.89 | 0.1771 | 2.8628 | 22.64 | 44.4 | 3 | 2 |
| Comparative Example 35 | 8.9 | 1.78 | Not formed | 1.78 | 0.6122 | 6.7229 | 18.99 | 12.4 | Not measured | 1 |
| Comparative Example 36 | 8.9 | 2.67 | Not formed | 2.67 | 1.1586 | 9.6678 | 18.83 | 4.1 | Not measured | 1 |
| Comparative Example 37 | 8.90 | 3.56 | 10.68 | 14.24 | 0.5 | 5.6 | 50.6 | 7.6 | 1 | 5 |
| Comparative Example 38 | 8.90 | 3.56 | 10.68 | 14.24 | 0.4 | 4.1 | 55.3 | 17.7 | 1 | 5 |
| Comparative Example 39 | 8.90 | 3.56 | 10.68 | 14.24 | 0.3 | 3.8 | 66.0 | 35.6 | 0 | 5 |

As can be confirmed from Tables 1 to 4, when the brightness L* of the surface of the roughened nickel layer was 30 to 50 and the glossiness of 85° of the surface of the roughened nickel layer was 1.5 to 50, the adhesion of the roughened nickel layer to the metal base material was good and the adhesion to the polypropylene resin (PP resin) was excellent (Examples 1 to 36).

On the other hand, when the roughened nickel layer was not famed, or when the brightness L* or the glossiness of 85° of the surface of the roughened nickel layer was outside the specified ranges defined in the present invention, the adhesion of the roughened nickel layer to the metal base material and/or the adhesion to the polypropylene resin (PP resin) was inferior (Comparative Examples 1 to 39).

Figure 6A:
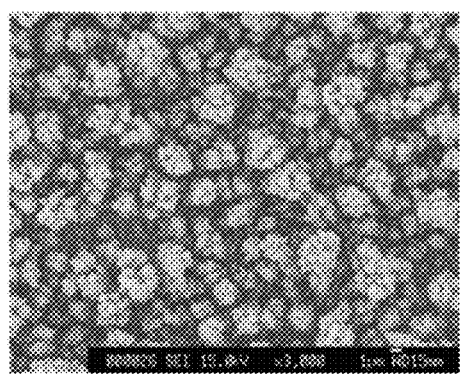
FIG. 6(A) and FIG. 6(B) are images obtained by observing a surface of a roughened nickel-plated sheet of Comparative Example 5 by a scanning electron microscope (SEM)
Figure 6B:
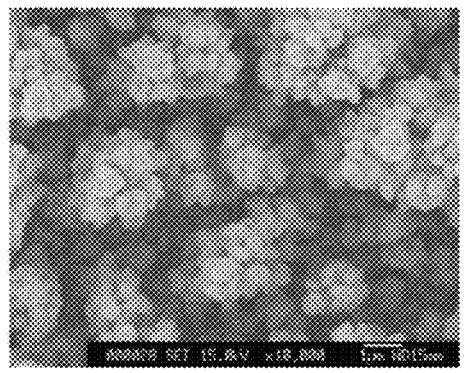
Figure 6C:
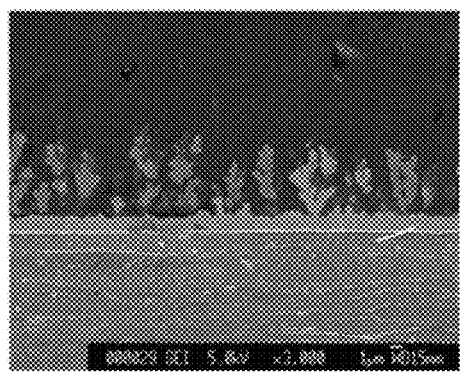
FIG. 6(C) and FIG. 6(D) are images obtained by observing a cross-section of a roughened nickel-plated sheet of Comparative Example 5 by scanning electron microscope (SEM).
Figure 6D:
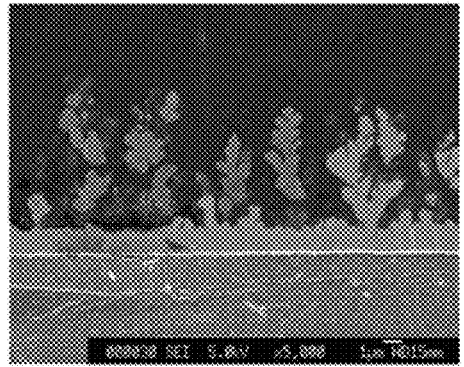

Incidentally, FIG. 5(A) and FIG. 5(B) are images obtained by observing the surface of the roughened nickel-plated sheet of Example 28 by a scanning electron microscope (SEM), FIG. 5(C) and FIG. 5(D) are images obtained by observing the cross-section of the roughened nickel-plated sheet of Example 28 by a scanning electron microscope (SEM). Further, FIG. 6(A) and FIG. 6(B) are images obtained by observing the surface of the roughened nickel-plated sheet of Comparative Example 5 by a scanning electron microscope (SEM), FIG. 6(C) and FIG. 6(D) are images obtained by observing the cross-section of the roughened nickel-plated sheet of Comparative Example 5 by a scanning electron microscope (SEM).

Note that, in FIG. 5(A) to FIG. 5(D), FIG. 6(A) to FIG. 6(D), the scale bars (white lines) in the measurement condition description portion at the lower left of the image, both indicate a length of 1 μm.

Further, in Table 1 to Table 4, the deposition amount of nickel of the underlying nickel layer was calculated from the processing conditions in the underlying nickel plating, and the calculated amount was described as "underlying nickel layer". Also, the deposition amount of nickel plating of the nickel film 122 was calculated from the processing conditions by the covering nickel plating, and the calculated amount was described as "nickel film". Note that, when performing the covering nickel plating, the nickel film forms the roughened nickel layer 12 as a nickel film 122 covering the nickel granules 121, and also a portion thereof forms the underlying nickel layer. That is, it also contributes to the growth of the underlying nickel layer. Actually, the thickness of the famed underlying nickel layer was calculated by scanning electron microscopy (SEM), and the amount of nickel of the underlying nickel layer was calculated from the calculated thickness, and it was 11.6 g/m$^2$ in Example 5, 11.6 g/m$^2$ in Example 6, 12.5 g/m$^2$ in Example 7, and 13.4 g/m$^2$ in Example 8. By calculating the difference between these values and the calculated values from the plating processing conditions of Examples 5 to 8, it is possible to calculate the growth of the underlying nickel layer. Similarly, in Examples 1 to 36, the difference was calculated to be 1.8 to 4.5 g/m$^2$ (shown in Table 1 and Table 2). Further, the averages thereof were also 2.8 g/m$^2$. Note that, in Table 1 and Table 2, the nickel thickness (μm) of the underlying nickel layer measured from the scanning electron microscopy (SEM) cross-sectional image is shown in the third column from the right, and the amount of nickel (g/m$^2$) of the underlying nickel layer calculated from the nickel thickness of the underlying nickel layer is shown in the second column from the right. In addition, in the rightmost columns of Table 1 and Table 2, the growth amount of the underlying nickel layer, that is, the amount of increase in the underlying nickel layer by performing covering nickel plating after performing plating for forming the underlying nickel layer, is shown.

In this manner, in the embodiment of the present application, when the deposition amounts of the underlying nickel layer and the roughened plating layer are obtained from the cross-sectional images of the scanning electron microscope, the deposition amounts (thicknesses) of the respective layers can be calculated by subtracting 2.8 g/m$^2$ (amount corresponding to 0.32 μm) from the underlying nickel layer and adding it to the roughened plating layer.

Example 42

After the underlying nickel layer was formed on both sides of the steel sheet under the same conditions as in Example 1, one side of the steel sheet on which the underlying nickel layer was formed was masked, and electroplating was performed on the opposite side of the masked side using the roughened nickel plating bath having the same bath composition as in Example 1 under the same conditions as in Example 1, whereby nickel granules were precipitated on the underlying nickel layer. Further, by performing electrolytic plating under the same condition as in Example 1 using the covering nickel plating bath having the same bath composition as in Example 1, covering nickel plating was performed, thereby obtaining a roughened nickel-plated sheet (a roughened nickel-plated sheet of the embodiment shown in FIG. 1B) in which the roughened nickel layer was formed on only one surface. The roughened nickel-plated sheet thus obtained was evaluated in the same manner as in Example 1, and it was confirmed that the same shape and the same effects were obtained.

REFERENCE SIGNS LIST 1, 1a—Roughened nickel-plated sheet
11—Metal base material
12—Roughened nickel layer
121—Nickel granules
122—Nickel film
13—Underlying metal plating layer

The invention claimed is:

1. A roughened nickel-plated sheet having a roughened nickel layer as an outermost surface layer on at least one surface of a metal base material, wherein
the brightness L* of the surface of the roughened nickel layer is 30 to 50,
the glossiness of 85° of the surface of the roughened nickel layer is 1.5 to 50.

2. The roughened nickel-plated sheet according to claim 1, wherein the metal base material is a metal sheet or a metal foil made of one kind of pure metal selected from Fe, Cu, Al, and Ni, or a metal sheet or a metal foil made of an alloy containing one kind selected from Fe, Cu, Al, and Ni.

3. The roughened nickel-plated sheet according to claim 1, wherein the metal base material is a steel sheet.

4. The roughened nickel-plated sheet according to claim 1, wherein the thickness of the metal base material is 0.01 to 2.0 mm.

5. The roughened nickel-plated sheet according to claim 1, wherein the roughened nickel layer has an arithmetic mean roughness Ra of 0.1 to 3.0 μm measured by laser microscopy, and the roughened nickel layer has a ten-point mean roughness $Rz_{jis}$ of 2.0 to 20.0 μm measured by laser microscopy.

6. The roughened nickel-plated sheet according to claim 1 comprising:
an underlying metal plating layer arranged between the metal base material and the roughened nickel layer.

7. The roughened nickel-plated sheet according to claim 6, wherein the total deposition amount of nickel plating of the roughened nickel layer and the underlying metal plating layer is 5.0 to 50.0 g/m$^2$.

8. The roughened nickel-plated sheet according to claim 7, wherein the deposition amount of nickel plating of the roughened nickel layer is 1.34 to 45.0 g/m$^2$.

* * * * *